United States Patent
de Puydt et al.

(10) Patent No.: US 7,498,381 B1
(45) Date of Patent: Mar. 3, 2009

(54) LOW PERMEABILITY ELASTOMERIC-METAL PHOSPHATE NANOCOMPOSITES

(75) Inventors: Yves Fernand de Puydt, Braine Le Château (BE); Herman Robberechts, Kapelle Op Den Bos (BE); Andy H. Tsou, Houston, TX (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 188 days.

(21) Appl. No.: 11/497,634

(22) Filed: Aug. 2, 2006

(51) Int. Cl.
*B01J 31/24* (2006.01)
(52) U.S. Cl. ...................................... 524/711
(58) Field of Classification Search ........... 524/711
See application file for complete search history.

(56) References Cited

U.S. PATENT DOCUMENTS

| | | |
|---|---|---|
| 2,631,984 A | 3/1953 | Crawford et al. |
| 3,099,644 A | 7/1963 | Parker et al. |
| 4,074,035 A | 2/1978 | Powers et al. |
| 4,384,072 A | 5/1983 | Newman et al. |
| 4,395,506 A | 7/1983 | Nagano et al. |
| 4,472,538 A | 9/1984 | Kamigaito et al. |
| 4,507,437 A | 3/1985 | Kato et al. |
| 4,513,116 A | 4/1985 | Kowalski et al. |
| 4,554,326 A | 11/1985 | Kowalski et al. |
| 4,632,963 A | 12/1986 | Gardner et al. |
| 4,649,178 A | 3/1987 | Gardner et al. |
| 4,650,831 A | 3/1987 | Bond |
| 4,681,921 A | 7/1987 | Gardner et al. |
| 4,703,091 A | 10/1987 | Gardner et al. |
| 4,810,734 A | 3/1989 | Kawasumi et al. |
| 4,889,885 A | 12/1989 | Usuki et al. |
| 5,071,913 A | 12/1991 | Powers et al. |
| 5,162,445 A | 11/1992 | Powers et al. |
| 5,182,333 A | 1/1993 | Powers et al. |
| 5,286,804 A | 2/1994 | Powers et al. |
| 5,482,544 A | 1/1996 | Okuda et al. |
| 5,548,029 A | 8/1996 | Powers et al. |
| 5,576,372 A | 11/1996 | Kresge et al. |
| 5,576,373 A | 11/1996 | Kresge et al. |
| 5,656,709 A | 8/1997 | Fukushima et al. |
| 5,665,183 A | 9/1997 | Kresge et al. |
| 5,681,901 A | 10/1997 | Newman |
| 5,807,629 A | 9/1998 | Elspass et al. |
| 5,883,173 A | 3/1999 | Elspass et al. |
| 5,932,634 A | 8/1999 | Hosokawa et al. |
| 5,936,023 A | 8/1999 | Kato et al. |
| 5,942,298 A | 8/1999 | Sakaya et al. |
| 5,973,053 A | 10/1999 | Usuki et al. |
| 6,034,164 A | 3/2000 | Elspass et al. |
| 6,060,549 A | 5/2000 | Li et al. |
| 6,103,817 A | 8/2000 | Usuki et al. |
| 6,121,361 A | 9/2000 | Usuki et al. |
| 6,228,978 B1 | 5/2001 | Agarwal et al. |
| 6,465,543 B1 | 10/2002 | Alexandre et al. |
| 6,548,585 B1 | 4/2003 | Ozawa et al. |
| 6,841,642 B2 | 1/2005 | Kaszas |
| 6,872,687 B2 | 3/2005 | Shimada et al. |
| 2002/0031716 A1 | 3/2002 | Nagata et al. |
| 2004/0033186 A1 | 2/2004 | Bougelot et al. |
| 2005/0256238 A1 | 11/2005 | Dupuy et al. |
| 2006/0046199 A1 | 3/2006 | Mitsumoto et al. |
| 2006/0155030 A1* | 7/2006 | Aupaix et al. ............... 524/413 |

FOREIGN PATENT DOCUMENTS

| | | |
|---|---|---|
| FR | 2871792 | 6/2004 |
| JP | 11105082 | 4/1999 |
| WO | WO92/02582 | 2/1992 |
| WO | WO94/22680 | 10/1994 |
| WO | WO01/85831 | 11/2001 |
| WO | WO02/100935 | 12/2002 |
| WO | WO02/100936 | 12/2002 |
| WO | WO2004/058874 | 7/2004 |

OTHER PUBLICATIONS

Nielsen, "Models for the Permeability of Filled Polymer Systems," *J. Macromol. Sci. (Chem.)* (1967), A1(5), 929-942.
Clearfield, et al., "On the Mechanism of Ion Exchange in Zirconium Phosphates," *J. Inorg. Nucl. Chem.* (1978), 41, 871-878.
Gusev et al., Adv. Mater., vol. 13, p. 1641 (2001).
Rubber Technology 311-321 (Maurice Morton ed., Chapman & Hall 1995).
Subramaniam in Rubber Technology 179-208 (Maurice Morton, Chapman & Hall 1995).
Tsou et al., Evaluation of Organosilicate Dispersion in Polymer Nanocomposites by Permeability (ExxonMobil Company, Stony Brook University 2005).

* cited by examiner

*Primary Examiner*—Robert D. Harlan
(74) *Attorney, Agent, or Firm*—Catherine L. Bell; Xiaobing Feng

(57) ABSTRACT

The present invention provides a nanocomposite of an isobutylene-based elastomer and a phosphate nanofiller. Also disclosed is a nanocomposite embodiment wherein the elastomer is BIMSM and high aspect ratio, partially intercalated, partially exfoliated alpha-zirconium phosphate treated with amine or amide. A dispersion aid can include a low molecular weight polymer or oligomer, optionally functionalized with a polar group. The nanocomposite is suitable for use as an air barrier.

78 Claims, No Drawings

LOW PERMEABILITY ELASTOMERIC-METAL PHOSPHATE NANOCOMPOSITES

FIELD OF THE INVENTION

This invention relates to low permeability elastomeric-metal phosphate nanocomposite compositions, more particularly to isobutylene-based elastomers containing platy nano-fillers of alpha-zirconium phosphate, and especially to halogenated isobutylene elastomers, such as halogenated poly(isobutylene-co-p-methylstyrene) elastomers, particularly brominated poly(isobutylene-co-p-methylstyrene) elastomers (BIMSM), filled with alpha-zirconium phosphate exchanged with monoamines, diamines, tertiary amines, polyamides, or a combination thereof, with or without a dispersion aid such as low molecular weight polar modified polymer.

BACKGROUND OF THE INVENTION

Polymers with a saturated hydrocarbon backbone are well known to possess good environmental and aging resistance which makes them highly desirable in a variety of applications. In comparison with many other common elastomers, polyisobutylene and its copolymers are notable for their low permeability to small-molecule diffusants as a result of their efficient intermolecular packing. This efficient packing in isobutylene polymers leads to their low fractional free volumes and low diffusion coefficients for penetrants. In combination with the low solubilities of small-molecule diffusants in isobutylene polymers, the low diffusion coefficients lead to the observation of low permeability values in isobutylene polymers relative to other elastomers. This low degree of permeability to gases accounts for the largest uses of butyl and halobutyl rubbers, namely tire inner tubes and tire innerliners. Among all commercially available isobutylene elastomers, brominated poly(isobutylene-co-paramethylstyrene), also referred to as BIMSM, has the lowest permeability.

Nanocomposites are polymer systems containing inorganic particles with at least one dimension in the nanometer range. Some examples of these are disclosed in U.S. Pat. No. 6,060,549, U.S. Pat. No. 6,103,817, U.S. Pat. No. 5,973,053, U.S. Pat. No. 5,936,023, U.S. Pat. No. 5,883,173, and U.S. Pat. No. 5,576,372. Common types of inorganic particles used in nanocomposites are phyllosilicates, an inorganic substance from the general class of so called "nano-clays" or "clays" generally provided in an intercalated form wherein platelets or leaves of the clay are arranged in a stack in the individual clay particles with interleaf spacing usually maintained by the insertion of another compound or chemical species between the adjacent lamellae. Ideally, intercalation should take place in the nanocomposite, wherein the polymer inserts into the space or gallery between the clay surfaces. Ultimately, it is desirable to have exfoliation, wherein the polymer is fully dispersed with the individual nanometer-size clay platelets. Due to the general enhancement in air barrier qualities of various polymer blends when clays are present, there is a desire for a nanocomposite with low air permeability; especially a vulcanized elastomer nanocomposite such as used in the manufacture of tires.

It is known from U.S. Pat. No. 5,576,373 and U.S. Pat. No. 5,665,183 to introduce organosilicates into styrene-butadiene rubber (SBR) to lower permeability values. High loadings in the SBR of montmorillonite silicates intercalated with an amine-terminated butadiene-acrylonitrile oligomer were reported to reduce the permeability of the SBR, but the permeability values of these filled rubbers were still significantly higher than those of halobutyl or BIMSM rubbers. Direct blending of BIMSM of low or high molecular weights with dimethyldialkyl ammonium-exchanged montmorillonite silicates in U.S. Pat. No. 5,807,629 and U.S. Pat. No. 6,034,164 (Elspass et al.) provided BIMSM-layered silicate nanocomposites with significantly lower permeability values. However, organosilicates in both the reactive oligomer/SBR blends and in the BIMSM nanocomposites were not exfoliated.

The extents of dispersion, exfoliation, and orientation of platy nano-fillers such as organosilicates, mica, hydrotalcite, graphitic carbon, etc., could strongly influence the permeability of the resulting polymer nanocomposites. The barrier property of a polymer in theory is significantly improved, by an order of magnitude, with the dispersion of just a few volume percent of exfoliated high aspect-ratio platy fillers, due simply to the increased diffusion path lengths resulting from long detours around the platelets. Nielsen, *J. Macromol. Sci. (Chem.)*, vol. A1, p. 929 (1967), discloses a simple model to determine the reduction in permeability in a polymer by accounting for the increase in tortuousity from impenetrable, planarly oriented platy fillers. Gusev et al., *Adv. Mater.*, vol. 13, p. 1641 (2001), discloses a simple stretched exponential function relating the reduction of permeability to aspect ratio times volume fraction of the platy filler, that correlates well with permeability values numerically simulated by direct three-dimensional finite element permeability calculations.

For rubber compounding applications, small sub-micron fillers such as carbon black and silica are used for fatigue resistance, fracture toughness and tensile strength. Filler particles larger than a micron act tend to concentrate stress and initiate defects. Thus, platy nanofillers added to reduce permeability are desirable in elastomers. To maximize the effect of aspect ratio on permeability reduction, it is useful to maximize the degree of exfoliation and dispersion of the platelets, which are generally supplied in the form of an intercalated stack of the platelets. However, in isobutylene polymers, dispersion and exfoliation of platy nanofillers requires sufficient favorable enthalpic contributions to overcome entropic penalties. As a practical matter, it has thus proven to be very difficult to disperse ionic nanofillers such as clay into generally inert, nonpolar, hydrocarbon elastomers. The prior art has, with limited success, attempted to improve dispersion by modification of the clay particles, by modification of the rubbery polymers, by the use of dispersion aids, and by the use of various blending processes.

The "inertness" of saturated hydrocarbon polymers such as BIMSM, their low reactivity and incompatibility with most other materials, and the difficulties in adhering them to, or using them in conjunction with most other materials has restricted their use in many areas. Chemical modification of the elastomers, modification of the blend component, and the use of additional compatibilizing blend components, have been attempted. U.S. Pat. No. 5,162,445 discloses a method to improve polymer blend compatibility or blend co-curability by copolymerizing an unsaturated comonomer and/or a comonomer having reactive functionality with isobutylene. U.S. Pat. No. 5,548,029 discloses graft copolymers of isobutylene-p-methylstyrene copolymers to compatibilize blends of saturated and unsaturated elastomers.

The preparation of nanocomposites uses a number of methods to generate exfoliated clays. Swelling agents and processes for intercalating layered silicates are disclosed in U.S. Pat. Nos. 4,472,538, 4,810,734, 4,889,885 as well as WO92/02582. For example, cationic surfactants are employed with anionic montmorillonites or other phyllosilicates to facilitate dispersion, and anionic surfactants with cationic hydrotalcites. One of the most common methods relies upon the use of organically modified montmorillonite clays. Organoclays are typically produced through solution based ion-exchange reactions that replace sodium ions that exist on the surface of sodium montmorillonite with organic molecules such as alkyl or aryl ammonium compounds and are typically known in the industry as swelling or exfoliating agents. See, e.g., U.S. Pat. No. 5,807,629, WO02/100935, and WO02/100936. Other background references include U.S. Pat. No. 5,576,373, U.S. Pat. No. 5,665,183, U.S. Pat. No. 5,807,629, U.S. Pat. No. 5,936,023, U.S. Pat. No. 6,121,361, WO94/22680, WO01/85831, and WO04/058874.

Another method to improve the organoclay performance has been to use functionalized polymers to treat the clay. This approach uses materials that are soluble in water or materials that can be incorporated into the polymerization reaction. This approach has been used to prepare nylon-clay nanocomposites, using for example, oligomeric and monomeric caprolactam as the modifier. Polyolefin-clay nanocomposites, such as polypropylene nanocomposites, have utilized maleic anhydride grafted polypropylenes to achieve some success in the formation of nanocomposites.

For example, it is known to utilize exfoliated-clay filled nylon as a high impact plastic matrix, such as disclosed in U.S. Pat. No. 6,060,549 (Li et al.). In particular, Li et al. discloses a blend of a thermoplastic resin such as nylon; a copolymer of a $C_4$ to $C_7$ isoolefin, a para-methylstyrene and a para-(halomethylstyrene); and exfoliated clays that are used as a high impact material. Further, Japanese Unexamined Application P2000-160024 (Yuichi et al.) discloses a thermoplastic elastomer composition which can be used as an air barrier, including a blend similar to that disclosed in Li et al.

The preparation of BIMSM-clay nanocomposites from melt-blending, solution blending and an emulsion process are disclosed in commonly assigned U.S. application Ser. No. 11/183,361, Split-Stream Process for Making Nanocomposites, by W. Weng et al., filed Jul. 18, 2005; and commonly assigned U.S. application Ser. No. 11/184,000, Functionalized Isobutylene Polymer-Inorganic Clay Nanocomposites and Organic-Aqueous Emulsion Process, by W. Weng et al., filed Jul. 18, 2005.

U.S. Pat. No. 6,841,642 to Kaszas (WO02/16452) discloses a polymer formed by reaction of a mixture of isobutylene, isoprene, divinylbenzene and a chain transfer agent. Incorporation of DVB to the isobutylene—isoprene copolymer with the chain transfer agent is said to provide a butyl polymer having an improved (higher degree of) filler dispersion.

U.S. Pat. No. 6,548,585 (Ozawa et al.) discloses refrigerant hoses made with an inner tube composition of a brominated copolymer rubber such as BIMSM with an inorganic lamellar compound such as graphite, zirconium phosphate, calcogenides, talc, kaolinite, benotnite, montmorillonite, mica, chlorite, etc.

Other general background references that have suggested general polymer compositions containing zirconium phosphate include U.S. Pat. No. 6,872,687 (Shimada et al.); Publication US20020031716 (Nagata et al.); and Publication US20060046199 (Mitsumoto et al.).

Publication US2005026238 (Dupuy et al.) and Publication US20040033186 (Bougelot et al.) disclose zirconium phosphate intercalated with amines, and thermoplastic compositions comprising mixtures of the zirconium phosphate in a thermoplastic polymer.

SUMMARY OF THE INVENTION

The present invention provides elastomeric nanocomposites made with metal phosphate nanofillers dispersed in an isobutylene-based rubber, such as, by way of non-limiting example, amine- or amide-modified alpha-zirconium phosphate in a halogenated poly(isobutylene-co-p-methylstyrene) elastomer, preferably brominated poly(isobutylene-co-p-methylstyrene) elastomer (BIMSM). Elastomeric nanocomposites incorporating the modified metal phosphates have unexpectedly improved intercalation, exfoliation and/or dispersion compared to the nanoclays and other prior art nanofillers, and further have improved barrier and other desirable properties.

Although not intending to be bound by any one theory, the unique ion exchange characteristics of the metal phosphate nanofillers may explain their improved performance. The ion exchange behavior of platy crystalline alpha-zirconium phosphate depends on its crystallinity. The phosphate proton can be removed or exchanged with cations. If amines or amides are used to intercalate alpha-zirconium phosphate, hydrogen bonds form between amine or amide and phosphate. See Clearfield et al., J. Inorg. Nucl. Chem., vol. 41, p. 871 (1979). The hydrogen bonding of the amine or amide intercalants facilitates more favorable interactions for isobutylene-based elastomers to intercalate and/or to exfoliate zirconium phosphate. In addition, zirconium phosphate can be crystallized in a commercial process, not mined and processed like montmorillonites or other phyllosilicates, and hence zirconium phosphate can have a more uniform and monodisperse particle size and aspect ratio.

In one embodiment, the nanocomposite broadly comprises an isobutylene-based elastomer filled with platy nanofiller comprising ion-exchangeable phosphate, wherein phosphate protons are exchanged with a compound capable of hydrogen bonding with the phosphate.

In various embodiments, the nanofiller is in the form of platelets having an aspect ratio of 200 or more, 375 or more, or 500 or more. The phosphate can be a metal phosphate such as titanium phosphate, alpha-zirconium phosphate, or the like. The nanofiller can be used in one embodiment at from 0.1 to 30 parts by weight per 100 parts by weight rubber or elastomer (phr). In embodiments, the nanofiller is intercalated, exfoliated, or preferably is a mixture of intercalated nanofiller and partially exfoliated nanofiller in the elastomer. Embodiments of the extent of exfoliation include exfoliation of from 0.0001 to 10 volume percent of the nanofiller, from 0.005 to 5 volume percent, or from 0.01 to 0.5 volume percent of the nanofiller.

In an embodiment of the invention, the nanofiller is surface exchanged with an amine, preferably in an amount effective to intercalate the nanofiller. In embodiments, the nanofiller is amine-exchanged in an amount from at least 25 but less than 100 percent of exchange capacity, or at from 25 to 50 percent of exchange capacity. In different embodiments, the amine is a monoamine or diamine, and the amine groups can be primary amines, secondary amines, tertiary amines, quaternary amines, or a combination thereof. The amine can be embodied as a short chain alkylamine or diamine wherein the alkyl group has from 1 to 12 or 13, 1 to 10, 2 to 8, 2 to 6, or 2 to 4 carbon atoms; or as a long chain alkylamine or diamine having 14 or more carbon atoms, e.g. 15 to 50, 16 to 30, 16 to 30, or 18 to 24 carbon atoms. The amine can be exchanged in either an overlapping configuration between the opposing platelet surfaces, or in a double layer configuration.

As diamine embodiments, the diamine can have two primary amine groups, or can be a short chain alkylene diamine. In another embodiment, the diamine comprises a primary amine group and a tertiary amine. In alternate embodiments, a ratio of amine to exchangeable phosphate groups is less than 1 and the primary amine is predominantly attached to the phosphate; the ratio of amine to exchangeable phosphate groups is greater than 1 and the tertiary amine is predominantly attached to the phosphate; or the ratio of amine to exchangeable phosphate groups is between 0.5 and 2 and the amine attachment to the phosphate is heterogeneous.

As another embodiment, the nanofiller is surface exchanged with an amine-terminated oligoamide, for example, an oligoamide comprised of from 2 to 4 monomer units, including wherein the oligoamide monomer units comprise from 2 to 12 carbons per unit, or wherein the oligoamide comprises a molecular weight from 150 to 2000 Daltons.

In one embodiment, the nanofiller is surface exchanged with a mixture of monoamine and diamine that can be in a molar ratio of monoamine:diamine from 1:20 to 20:1. In alternate embodiments, the monoamine comprises a primary amine and the diamine comprises a primary amine group and a tertiary amine group; or the diamine comprises a primary-tertiary diamine and a primary-secondary diamine. A molar ratio of monoamine to diamine can be from 1:1 to 20:1, or from 3:1 to 10:1, and in an embodiment the nanofiller is amine-exchanged at from 25 to 50 percent of exchange capacity.

In another embodiment, the nanocomposite includes a dispersant aid, such as a low molecular weight polymer or oligomer, which can be functionalized with a polar group and blended in a matrix of the isobutylene-based elastomer. In various embodiments, the dispersant aid can be a polymer or oligomer of a $C_4$-$C_8$ isoolefin, such as isobutylene; an interpolymer of a $C_4$-$C_7$ isoolefin and an alkylstyrene; a polyamide, which can have terminal amine groups, such as polyoxyalkylenediamine polyamide obtained as the reaction product of a polyoxyalkylenediamine and a dicarboxylic acid; or the like. The dispersant aid can have a number average molecular weight up to 100000, between 500 and 50000, or between 2000 and 25000. The polar group can make up from 0.1 to 10 weight percent of the dispersant aid in one embodiment, or from 0.5 to 7.0 weight percent of the dispersant aid in another. The dispersant aid can be functionalized with between 0.01 and 10 weight percent of a polar group in one embodiment; 0.01 weight percent to 10 weight percent of the polymer in one embodiment, and from 0.1 weight percent to 8 weight percent in another embodiment, from 0.2 to 7 weight percent in yet another embodiment, from 0.2-5.0 weight percent in another embodiment, from 0.3-3.0 weight percent in another embodiment, and from 0.5 to 2.0 weight percent in another embodiment, wherein a desirable range may be any combination of any upper weight percent limit with any lower weight percent limit. In embodiments, a weight ratio of the functionalized low molecular weight polymer or oligomer to the elastomer is between 0.01:1 and 1:1, or between 0.05:1 and 0.5:1.

In the dispersant aid embodiments, the low molecular weight polymer or oligomer can be functionalized with the polar group selected from the group consisting of alcohols, ethers, acids, anhydrides, nitriles, amines, acrylates, esters, ammonium ions, and the like, including combinations thereof. In the amine-functionalized embodiment, the amine can be a primary, secondary, tertiary, or quaternary amine.

The polar group can be derived from an acid anhydride, such as a cyclic anhydride, a symmetric anhydride, a mixed anhydride, or combinations thereof. The acid anhydride can be a carboxylic anhydride, a thioanhydride, a phosphoric anhydride, or mixtures thereof.

In one embodiment, the acid anhydride is a carboxylic acid anhydride. In certain embodiments, the carboxylic acid anhydride is maleic anhydride, succinic anhydride, or a combination thereof.

In one embodiment, the polar group is derived from an acid. The acid can be a carboxylic acid, a dicarboxylic acid, a tricarboxylic acid, an oxo carboxylic acid, a peroxy acid, a thiocarboxylic acid, a sulfonic acid, a sulfinic acid, a xanthic acid, sulfenic acid, sulfamic acid, a phosphonic acid, an amic acid, an azinic acid, an azonic acid, a hydroxamic acid, an imidic acid, an imino acid, a nitrosolic acid, a nitrolic acid, a hydrazonic acid, or mixtures thereof. A useful acid is maleic acid.

In an embodiment, the low molecular weight polymer or oligomer can be grafted to the exchanged-amine on the phosphate, such as by reaction between the exchanged amine and the polar group on the low molecular weight polymer or oligomer, for example, by forming an amide linkage between a free amine of a phosphate-exchanged diamine and an acid functional group on the low molecular weight polymer or oligomer.

In an embodiment, the isobutylene based elastomer is preferably an interpolymer of isobutylene and an alkylstyrene. In embodiments, the elastomer has a number average molecular weight between 25,000 and 500,000, or at least 100,000. The elastomer can include functional groups such as halides, ethers, amines, amides, esters, acids, hydroxyls, or the like. In preferred embodiments, the elastomer is functionalized with an amine and/or is halogenated with bromine or chlorine, such as a halogenated polyisobutylene for example, or a halogenated copolymer of isobutylene and para-methylstyrene as another example. In one embodiment, the elastomer is essentially free of polar functionalization, or in another embodiment, the halogenated elastomer is essentially free of polar functionalization other than the halogenation. (By essentially free is meant that polar functionalization is present at less than 0.1 mole %). In another embodiment, the elastomer or halogenated elastomer is less functionalized than the dispersant-aid, functionalized low molecular weight polymer or oligomer. The nanocomposite can also include a filler selected from calcium carbonate, mica, silica, silicates, talc, titanium dioxide, carbon black, and mixtures thereof. A dye, pigment, antioxidant, heat or light stabilizer, plasticizer, oil, or mixtures thereof are present in the nanocomposite of other embodiments. In other embodiments, organic peroxide, zinc oxide, zinc stearate, stearic acid, an accelerator, a vulcanizing agent, or mixtures thereof are present in the elastomer. In an embodiment, the nanocomposite is cured.

The isobutylene-based elastomer can include a polymer chain E comprising an ammonium-functionalized group. The ammonium functionalized group can be described by the following group pendant to the polymer chain E:

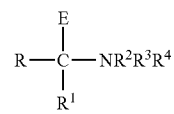

wherein R and $R^1$ are the same or different and are one of a hydrogen, $C_1$ to $C_7$ alkyls (preferably methyl, ethyl, propyl butyl, pentyl, or hexyl), and primary or secondary alkyl halides; and wherein $R^2$, $R^3$ and $R^4$ are the same or different and are selected from hydrogen, $C_1$ to $C_{20}$ alkyls (preferably methyl, ethyl, propyl butyl, pentyl, or hexyl), alkenes or aryls (preferably phenyl), substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions.

A method to form a nanocomposite can include the step of dispersing amine-modified zirconium phosphate nanofiller in a halogenated isobutylene based elastomer under conditions effective to at least partially exfoliate the nanofiller. In an embodiment, the method can include intercalating the nanofiller and blending the intercalated nanofiller with the halogenated elastomer. In various embodiments, the dispersion step can include melt blending the intercalated nanofiller with the halogenated elastomer, solution blending the intercalated nanofiller with the halogenated elastomer, blending an aqueous dispersion of the intercalated nanofiller with a solution of the halogenated elastomer in a solvent immiscible with water, or the like. In the aqueous dispersion embodiment, the aqueous phase can be dispersed in a continuous phase comprising the halogenated elastomer solution. The dispersion step can optionally include high shear conditions. In an embodiment, the method includes incorporating a curative into the nanocomposite, and optionally curing the nanocomposite.

In another embodiment, the invention provides an improvement in a process to manufacture a nanocomposite comprising an isobutylene based elastomer and nanofiller, wherein the nanofiller comprises partially exfoliated, partially intercalated amine-exchanged zirconium phosphate.

DETAILED DESCRIPTION

This invention describes isobutylene-based elastomer/nanofiller phosphate nanocomposites. The nanocomposite can include a halogenated isobutylene-based elastomer and a metal phosphate nanofiller, desirably an at least partially exfoliated alpha-zirconium phosphate nanofiller, suitable for use as an air barrier. The nanocomposite formed of this invention has improved air barrier properties and is suitable for use as an innerliner or innertube.

DEFINITIONS

As used herein, the new numbering scheme for the Periodic Table Groups is used as set forth in CHEMICAL AND ENGINEERING NEWS, 63(5), 27 (1985).

As used herein, "polymer" may be used to refer to homopolymers, copolymers, interpolymers, terpolymers, etc. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber."

As used herein, "phr" is 'parts per hundred rubber' and is a measure common in the art wherein components of a composition are measured relative to a major elastomer component, based upon 100 parts by weight of the elastomer(s) or rubber(s).

As used herein, "isobutylene based elastomer" or "isobutylene based polymer" or "isobutylene based rubber" refers to elastomers or polymers comprising at least 70 mole percent isobutylene.

As used herein, "isoolefin" refers to any olefin monomer having at least one olefinic carbon having two substitutions on that carbon.

As used herein, "multiolefin" refers to any monomer having two or more double bonds, for example, a multiolefin may be any monomer comprising two conjugated double bonds such as a conjugated diene such as isoprene.

As used herein, "nanocomposite" or "nanocomposite composition" refers to polymer systems containing inorganic particles with at least one dimension in the nanometer range within a polymer matrix.

As used herein, "intercalation" refers to the state of a composition in which a material (such as an inorganic or organic molecule or ion, oligomer or polymer) is present between each layer of a platelet filler. As is recognized in the industry and by academia, some indicia of intercalation can be the shifting and/or weakening of detection of X-ray lines as compared to that of original platelet fillers, indicating a larger spacing between vermiculite layers than in the original mineral.

As used herein, "overlapping configuration" between the opposing platelet surfaces in an intercalated particle refers to an arrangement wherein the molecular tails of the intercalant from the opposing surfaces are overlapping or intertwined in a single or common layer between the platelets, whereas "double layer configuration" refers to an arrangement wherein the intercalant tails are generally end-to-end in more or less separate layers. The overlapping configuration generally manifests tighter platelet spacing, whereas the double layer configuration yields larger d spacing.

As used herein, "exfoliation" refers to the separation of individual layers of the original inorganic particle, so that polymer can surround or surrounds each separated particle. In an embodiment, sufficient polymer or other material is present between each platelet such that the platelets are randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy, atomic force microscopy, etc. For purposes of this invention and claims thereto exfoliation is measured by transmission electron microscopy (TEM), on a 100 nm thick sample.

The term "aspect ratio" is understood to mean the ratio of the larger dimension of the leaves or platelets of nanofiller, to the thickness of the individual leaf or of the agglomerate or stack of leaves. The thickness of the individual leaf can be determined by crystallographic analysis techniques, whereas the larger dimension of a leaf are generally determined by analysis by transmission electron microscopy (TEM), both of which are known in the art.

The term "average aspect ratio" refers to the volume average aspect ratio, i.e., the third moment of the aspect ratio distribution, unless otherwise indicated.

As used herein, "solvent" refers to any substance capable of dissolving another substance. When the term solvent is used it may refer to at least one solvent or two or more solvents unless specified. In certain embodiments, the solvent is polar; in other embodiments, the solvent is non-polar.

As used herein, "solution" refers to a uniformly dispersed mixture at the molecular level or ionic level, of one or more substances (solute) in one or more substances (solvent). For example, solution process refers to a mixing process that both the elastomer and the modified layered filler remain in the same organic solvent or solvent mixtures.

As used herein, "suspension" refers to a system consisting of a solid dispersed in a solid, liquid, or gas usually in particles of larger than colloidal size.

As used herein, "emulsion" refers to a system consisting of a liquid or liquid suspension dispersed with or without an emulsifier in an immiscible liquid usually in droplets of larger than colloidal size.

As used herein, "hydrocarbon" refers to molecules or segments of molecules containing primarily hydrogen and carbon atoms. In some embodiments, hydrocarbon also includes halogenated versions of hydrocarbons and versions containing herteroatoms as discussed in more detail below.

As used herein, "polar group" refers to a group of atoms with asymmetrically arranged polar bonds in which the difference in electronegativity of bonding atoms, using the Linus Pauling scale of electronegativities, is greater than 0.3 and less than 1.7. In contrast to ionic groups in which there is charge separation to facilitate cation exchange with the cations between nanofiller layers, there is generally no charge separation in polar groups. Polar groups can interact with charged nanofiller surfaces, or to react with intercalates attached (chemically, ionically, or physically) to a nanofiller surface, but usually serve as dispersion aids and not generally as intercalates.

Nanofillers

According to an embodiment of the invention, the nanofiller, introduced into or otherwise incorporated within the isobutylene-based elastomer matrix to improve barrier properties, is a platy compound based on a phosphate that can be ion-exchanged with a compound capable of forming hydrogen bonds with the phosphate, for example, a phosphate of one or more metals, such as, zirconium, titanium, or the like. Alpha-zirconium phosphate crystals are a specific representative example used herein for the purpose of illustration.

In an embodiment, the metal phosphate is intercalated by surface exchange with an amine and can exhibit any interleaf distance effective to maintain a uniform spacing of the leaves, such as less than 200 Å, less than 100 Å, less than 50 Å, less than 40 Å, less than 30 Å, less than 25 Å, less than 20 Å, less than or equal to 15 Å, or less than or equal to 13 Å. In one embodiment, the interleaf spacing is greater than 15, greater than 20 or greater than 25 Å, and less than 200, less than 100, or less than 50 Å. The individual leaves can exhibit an aspect ratio of greater than 100, greater than 200, greater than 250, greater than 300, greater than 350, greater than 375, greater than 400 or greater than 500; and, in partially exfoliated, partially intercalated form in the elastomer matrix, can have an average aspect ratio of at least 50, at least 75, at least 100, at least 150, at least 200, at least 300, at least 350 or at least 375.

Intercalated nanofillers can improve the ability of the nanocomposite to absorb energy. The average aspect ratio of the particles dispersed in the isobutylene-based elastomeric matrix will increasingly approach the aspect ratio of the individual leaf as the percentage of exfoliation of leaves to individual leaves approaches 100%. At higher aspect ratios, the proportion of nanofiller exfoliated from the intercalated particles into the elastomer matrix required for improving barrier properties is reduced. For example, assume that target permeability in an elastomer with a nanofiller loading of 3 volume percent is about 10 to 20 percent of the permeability of the same elastomer without the nanofiller. The required average nanofiller aspect ratio is theoretically 375. If the individual exfoliated nanofiller leaves have an aspect ratio of 500, whereas the intercalated nanofiller particles have an aspect ratio of 12.5 (500 nm wide in a stack of 10 plates with a spacing of d=4 nm), only 0.05 percent (or a 0.0005 fraction) of the nanofiller needs to be exfoliated and 99.95 percent (0.9995 fraction) can be in the energy-absorbing, intercalated form.

In alternate embodiments, from 0.0001 to 10 volume percent, from 0.005 to 5 volume percent, or from 0.01 to 0.5 volume percent of the nanofiller is exfoliated; the remainder can be intercalated.

The nanofiller based on zirconium phosphate can be modified by treating the surfaces with an inorganic or organic compound comprising at least one functional group capable of reacting with the acid functional groups of the zirconium phosphate. For example, such an inorganic or organic compound can be in the form of a cation. Mention may be made, as inorganic compound in the cationic form, by way of example, of metal cations, alkali metal cations, such as $Na^+$, $K^+$ or $Li^+$, or the ammonium ion $NH_4^+$. Without wishing to be committed to any one theory, it is believed that such cations can be exchanged with the protons of the zirconium phosphate. A cation, such as $Na^+$, $K^+$, $Li^+$, or $NH_4^+$, corresponds to a functional group capable of reacting with the acid functional groups of the zirconium phosphate.

According to a specific embodiment of the invention, the inorganic or organic compound comprises a functional group capable of reacting with the phosphate acid groups of the zirconium phosphate, and preferably also capable of forming hydrogen bonds with the phosphate groups. This functional group can be a basic functional group, such as, for example, an amine. The functional group can, for example, be in a neutral or positively charged form.

According to another specific embodiment of the invention, the inorganic or organic compound comprises two functional groups capable of reacting with the acid functional groups of the zirconium and/or titanium phosphate. In particular, the organic compound is a compound according to the formula A—R—B wherein A and B are the same or different functional groups capable of reacting with the acid functional groups of the zirconium and/or titanium phosphate, and R is a substituted or unsubstituted aliphatic, cycloaliphatic or aromatic hydrocarbyl radical comprising from 2 to 20 carbon atoms which can include heteroatoms. The compound of formula A—R—B present in the compound based on zirconium and/or titanium phosphate comprises two functional groups A and B capable of reacting with the acid functional groups of the zirconium and/or titanium phosphate. The functional groups A and B can, for example, be basic functional groups capable of reacting with the protons of the zirconium and/or titanium phosphate. The functional groups A and B are preferably provided in a neutral or positively charged form. Mention may be made, as examples of functional groups A and B which may be suitable for the invention, of amines, ammoniums or phosphoniums.

Generally, the R radical is not reactive with respect to the acid functional groups of the zirconium and/or titanium phosphate nor with respect to the phosphate in general. According to a preferred form of the invention, the functional groups A and B are amine functional groups. Preferably, the compound A—R—B is chosen from hexamethylenediamine, 2-methylpentamethylenediamine, meta-xylenediamine, dimethylaminopropylamine, diethylaminopropylamine, aminopropylmorpholine, or the like.

According to specific embodiments of the invention, the molar ratio of the reactive functional groups of the inorganic or organic compound to the number of moles of the reactive sites of the zirconium and/or titanium phosphate is between 0.1 and 2, 0.2 and 1.9, 0.1 and 0.8, 0.3 and 0.75, 0.4 and 0.6, 1 and 2, 0.75 and 1.5, 1.5 and 2, 1.6 and 1.95, or the like, or substantially equal to 0.5. The number of moles of functional groups capable of reacting is understood to mean the sum of the number of moles of each functional group of the inorganic or organic compound capable of reacting. For example, for a compound comprising a single functional group capable of reacting, the number of moles of functional groups capable of reacting corresponds to the number of moles of the compound. For a compound comprising two functional groups capable of reacting per molecule, the number of moles of functional groups capable of reacting corresponds to twice the number of moles of the compound. Similarly, the number of moles of the zirconium and/or titanium phosphate capable of reacting is understood to mean the number of moles of elemental phosphorus. For example, one mole of zirconium phosphate compound generally corresponds to two moles of elemental phosphorus.

In one embodiment, the organic compound can be an amine, including monoamines, diamines, and polyamines, and each amine can independently be primary, secondary, tertiary or quaternary, and in the case of diamines and polyamines, combinations thereof, e.g., primary-primary, primary-secondary, primary-tertiary, etc. Furthermore, mixtures of amines may be used, e.g. a monoamine and a diamine, a primary-primary diamine and a primary-tertiary diamine, or a monoamine and a mixture of primary-primary and primary-tertiary diamines.

The selection of the type of amine and its ratio to phosphate groups can affect properties of the pre-intercalated phosphate nanofiller. The size and type of the exchange amine can be used to adjust the interleaf spacing, larger amines generally producing larger spacing. For example, a long chain alkylamine such as octadecyl amine at an amine to phosphate ratio (N/P) of 1 (100% exchanged) yields an alpha-zirconium phosphate having more of a double layer configuration and a spacing of d=48 Å. On the other hand, a short chain diamine such as hexamethylene diamine yields a generally monolayer configuration with one amine group attached to a phosphate group and one amine group free or unattached, with a spacing of d=12 Å at N/P of 0.5 (25% exchanged), and d=15 Å at N/P of 1 (50% exchanged).

In the case of primary-secondary and primary-tertiary diamine exchange compounds, exchange with either the primary amine group or the secondary/tertiary amine group can predominate, or it can be mixed. At low N/P, i.e. well below 1, the tertiary amine group can be anchored to the phosphate groups and the primary amine is free in a monolayer configuration, but at higher N/P the primary amine group is anchored and the tertiary amine is free in a double layer configuration. For example, a primary-tertiary diamine such as aminopropylmorpholine (APM) yields a generally monolayer configuration with the tertiary amine group attached to the phosphate and the primary amine group free or unattached, with a spacing of d=12 Å at N/P of 0.5 (25% exchanged); a generally double layer configuration with the primary amine group attached to the phosphate and the tertiary amine group free or unattached, with a spacing of d=22 Å at N/P of 2 (100% exchanged); and a heterogeneous structure with both primary and tertiary amine anchoring to the phosphates at an intermediate N/P of 1 (50% exchanged). Generally, primary and tertiary amine anchoring is observed by nuclear magnetic resonance imaging.

The phosphate nanofiller is preferably surface exchanged with an amine in an amount effective to facilitate pre-intercalation of the nanofiller prior to introduction into the isobutylene-based elastomer matrix. In the isobutylene-based elastomer matrix, the nanofiller can additionally or alternatively be intercalated in whole or in part by the elastomer. For example, the isobutylene-based elastomer can affiliate either by mixing with the tails attached to the exchanged amine groups that are attached to the phosphate groups, or by reacting or grafting on the exchange amine compound, e.g. via a free amine or other functional group on the tail of the exchanged amine compound. Or, the isobutylene-based elastomer, especially isobutylene-based elastomer functionalized with polar groups, can exchange or otherwise bond directly with the phosphate groups, either at "free" or unexchanged phosphates or by replacement of pre-exchanged amines.

In embodiments, the nanofiller phosphates are amine-exchanged at from 25 to 100 percent of exchange capacity, preferably from 25 to 50 percent of exchange capacity. Less than 100 percent exchange is desirable in one embodiment to avoid introducing free amines into the isobutylene-based elastomer matrix which could otherwise result in premature or prematurely accelerated curing of the elastomer, especially BIMSM. In an alternative embodiment, exchanged amines introduced into the elastomer with the phosphate nanofiller are used to effectively cure or accelerate curing of the elastomer matrix.

The extent of exchange with the amine compound can also be used to adjust properties and/or configuration of the nanofiller intercalates. In general, the greater the extent of exchange, the greater the interlamellar spacing d is. However, at higher extents of exchange as noted above, a double layer configuration develops and can approximately double the spacing.

As another embodiment, the nanofiller is surface exchanged with an amine-terminated oligoamide, for example, an oligoamide comprised of from 2 to 4 monomer units, including wherein the oligoamide monomer units comprise from 2 to 12 carbons per unit, or wherein the oligoamide comprises a molecular weight from 150 to 2000 Daltons. According to another advantageous form, the organic compound is an oligoamide prepared, for example, from an amino acid or a lactam, a polyamine such as diamine, and/or a polycarboxylic acid such as dicarboxylic acid. Mention may be made, for example, of caprolactam, butyrolactam. A specific representative example of a diamine dimer amide is the reaction product of 1 mole of caprolactam and 1 mole of hexamethylene diamine; the timer comprises 2 moles of caprolactam and 1 mole of hexamethylene diamine; and the tetramer comprises 3 moles of caprolactam and 1 mole of hexamethylene diamine.

The nanofiller compound based on zirconium and/or titanium phosphate is obtained by the process generally described in Publication US20050256238 (Dupuy et al.) and Publication US20040033186 (Bougelot et al.). Briefly, the process comprises the following successive stages: a) precipitation in acidic medium of a compound based on zirconium and/or titanium phosphate, starting from phosphoric acid and from a zirconium compound and/or from a titanium-based compound or from mixed compounds based on titanium and on zirconium, the titanium and/or the zirconium being in the IV oxidation state, b) crystallization of the compound, and c) treatment of the crystallized compound with amine, in liquid medium, at a pH of between 3 and 9.

The preparation process in an embodiment can, in addition to the three successive stages a), b) and c), can comprise other process stages or phases, before, after or between these stages, such as, for example, washing, purification, filtration, dilution, centrifuging or addition of compounds to adjust certain process parameters, such as the pH or the ionic strength.

Stage a) can consist of a precipitation of a compound based on zirconium and/or titanium phosphate. The preparation of such precipitates is known to a person skilled in the art, for example, from phosphoric acid and a zirconium and/or from a titanium compound in the plus four oxidation state, such as tetrahalides or oxyhalides, in particular zirconium oxychloride or titanium oxychloride, or mixed zirconium- and titanium-based compounds. A simplified balance of the precipitation reaction is, for example, as follows:

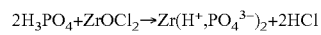

$$2H_3PO_4 + ZrOCl_2 \rightarrow Zr(H^+,PO_4^{3-})_2 + 2HCl$$

The precipitation is preferably carried out in aqueous medium. The use of phosphoric acid results in the precipitation medium being acidic. The precipitation can advantageously be carried out at acidic pH, preferably controlled acidic pH, for example of between 0.5 and 2. For this purpose, an acid may be used to complement the precursors of the precipitate, e.g. hydrochloric acid. The precipitate may crystallize as a lamellar structure at ambient temperature without it being necessary to carry out a crystallization operation distinct from the precipitation stage. However, it may be advantageous to carry out a distinct crystallization stage. Such a stage makes it possible to obtain, for the precipitated compound, a more marked and/or more uniform lamellar structure. The crystallization can be carried out by heat treatment in water or in an aqueous solution, for example by immersion of the compound in water at a temperature of between 100° C. and 200° C. The crystallization is preferably carried out in an acidic aqueous solution, for example a phosphoric acid solution. The duration of crystallization can be several hours. The crystallization stage is advantageously preceded by a phase of washing the precipitate, making it possible in particular to remove the ionic entities resulting from the precipitation reaction.

The crystallization stage is advantageously followed by a washing and centrifuging phase. According to a preferred characteristic, the pH measured in the aqueous phase of a dispersion comprising the crystallized compound, with a solids content of 20% by weight, is between 0.5 and 2. According to a preferred characteristic of the process, all the stages of the process are thus carried out at acidic pH between 0.5 and 2. According to another preferred characteristic, the lamellar compound is never dried, the only operations for the removal of water being filtration or centrifuging operations. The term "drying operation" is understood here to mean an operation during which the compound is introduced into a hot atmosphere devoid of water for a period of time of greater than 15 minutes, for example into an oven or spray drying.

The compound crystallizes in the alpha phase of zirconium phosphate. The structure of this phase has been described, for example, in *J. Inorg. Nucl. Chem.*, vol. 26, p. 117-129. This phase exhibits a lamellar structure, with protons intercalated between the lamellae. It is widely believed that these protons can be exchanged by a positively charged chemical entity.

The treatment stage c) consists in treating the crystallized compound in liquid medium at a pH of between 3 and 9.

The liquid medium is preferably an aqueous solution, in which the compound based on zirconium phosphate is dispersed. The aqueous solution comprises an inorganic or organic compound of such a nature and/or in such an amount that the pH is between 3 and 9. According to a preferred characteristic, the pH is between 4 and 7.

The inorganic or organic compound is chosen from compounds which, in aqueous solution, exhibit a pH of greater than 3, preferably greater than 7.

The compound is generally the amine compound or the compound of formula A—R—B described above, corresponding to the compound based on zirconium and/or titanium phosphate which it is desired to prepare. The use of these organic compounds may be very particularly indicated for the use of the compound with a lamellar structure for the improvement of barrier properties in an isobutylene-based elastomer.

By way of example, the inorganic compound for the treatment at a pH of between 2 and 7 can also be chosen from alkali metal or alkaline earth metal hydroxides, for example sodium hydroxide; inorganic compounds of the ammonium ion, such as ammonium hydroxide; or lithium, sodium or potassium cations, optionally in the presence of a basic agent. The organic compound can, for example, be an amine, caprolactam or ammonia.

After the treatment stage, the compound can be washed and/or separated from the liquid medium, for example by filtration or evaporation of the liquid medium, preferably evaporation of water. It can also be dried, e.g. in an oven and/or by spray drying. In an embodiment where the nanofiller is introduced into the elastomer in a solution and/or emulsion blending process, the nanofiller can be provided in the form of an aqueous slurry, emulsion, or invert emulsion. The inorganic or organic compound of the treatment stage c) is appropriately chosen according to the compound based on zirconium and/or titanium phosphate which it is desired to prepare.

There is thus obtained an inorganic compound with a lamellar structure which can easily exfoliate into platelet particles. The compound can be conditioned in various forms. It can be conditioned in the powder form, after removal of the liquid medium and optionally drying. It can be conditioned in the form of a dispersion in a liquid medium, for example water.

The layered nanofiller can be exfoliated by suspending the nanofiller in a water solution. Preferably, the concentration of nanofiller in water is sufficiently low to minimize the interaction between nanofiller particles and to at least partially or fully exfoliate the nanofiller. In one embodiment, the aqueous slurry of nanofiller can have a nanofiller concentration of between 0.1 and 5.0 weight percent; between 0.1 and 3.0 weight percent in other embodiments.

In certain embodiments, an aqueous slurry of nanofiller can be prepared by stirring nanofiller and water at room temperature for a time sufficient to exfoliate the nanofiller. In one embodiment, the nanofiller and water can be stirred for between 0.25 and 24 hours. The nanofiller and water can be stirred for between 4 and 16 hours, or between 10 and 14 hours, in other embodiments.

In other embodiments, the nanofiller can be mixed with an organic liquid to form a nanofiller dispersion. The organic liquid can be miscible or immiscible in water. In certain embodiments, the dispersion can have a nanofiller concentration of between 0.1 and 5.0 weight percent; between 0.1 and 3.0 weight percent in other embodiments.

The layered nanofiller can also be intercalated and exfoliated by treatment with organic molecules (swelling or exfoliating "agents" or "additives") capable of undergoing ion exchange reactions with the cations present at the interlayer surfaces of the layered phosphate. Suitable exfoliating additives include cationic surfactants such as ammonium ion, alkylamines or alkylammonium ion (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R^{12}R^{13}R^{14}N$, wherein $R^{12}$, $R^{13}$, and $R^{14}$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so called long chain tertiary amine, wherein at least $R^{12}$ is a $C_{14}$ to $C_{20}$ alkyl or alkene.

The exfoliating agent can also be a diamine compound (or the corresponding ammonium or diammonium ion), such as diaminoalkane, N-alkyl-diaminoalkane, N,N-dialkyl-diaminoalkyl, N,N,N'-trialkyl-diaminoalkane, N,N,N',N'-tetraalkyl-diaminoalkane, or the like. Desirable diamines can have the structure $R^{18}R^{19}N—R^{20}—NR^{21}R^{22}$, wherein $R^{18}$, $R^{19}$, $R^{20}$, $R^{21}$, and $R^{22}$ are the same or different $C_1$ to $C_{30}$ alkyls or alkenes, or $C_1$ to $C_{20}$ alkyls or alkenes. When a long chain diamine is desired, at least one of the N-alkyl or N-alkene groups has from 8 to 30 carbon atoms, preferably from 14 to 20 carbon atoms. Specific non-limiting, illustrative examples include N-coco-1,3-diaminopropane, N-oleyl-1,3-diaminopropane, N-tallow-1,3-diaminopropane, N,N,N'-trimethyl-N'-tallow-1,3-diaminopropane, and so on.

Another class of exfoliating additives include those which can be covalently bonded to the interlayer surfaces. These include polysilanes of the structure $—Si(R^{15})_2R^{16}$ where $R^{15}$ is the same or different at each occurrence and is selected from alkyl, alkoxy, aminosilane or oxysilane, preferably having 1 to 20 carbon atoms, and $R^{16}$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials.

In a preferred embodiment of the invention, the exfoliating additive or additives are capable of reaction with the halogen sites on the interpolymer to form complexes which help exfoliate the nanofiller. In one embodiment, the additive includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkylmethylamine and the like, and amine-terminated polytetrahydrofuran; long-chain thiol and thiosulfate compounds like hexamethylene sodium thiosulfate.

The exfoliating additive such as described herein is present in the composition in an amount to achieve optimal air retention as measured by the permeability testing described herein. For example, the additive may be present from 0.1 to 20 phr in one embodiment, from 0.1 to 15 phr in yet another embodiment, and from 0.1 to 10 phr in yet another embodiment. The exfoliating additive may be added to the composition at any stage; for example, the additive may be added to the interpolymer, followed by addition of the nanofiller, or may be added to the interpolymer and nanofiller mixture; or the additive may be first blended with the nanofiller, followed by blending with the interpolymer in yet another embodiment.

In another embodiment of the invention, improved interpolymer impermeability is achieved by the presence of at least one polyfunctional curative. An embodiment of such polyfunctional curatives can be described by the formula Z—$R^{17}$—Z', wherein $R^{17}$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a desirable class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (Don. R. Smith, ed., Lippincott & Petto Inc. 2001). The polyfunctional curative, if present, may be present in the composition from 0.1 to 8 phr in one embodiment, and from 0.2 to 5 phr in yet another embodiment.

Treatment with the swelling agents described above results in intercalation or "exfoliation" of the layered platelets as a consequence of a reduction of the ionic forces holding the layers together and introduction of molecules between layers which serve to space the layers at distances of greater than 4 Å, preferably greater than 9 Å. This separation allows the layered phosphate to more readily absorb polymerizable monomer material or exfoliating additive and polymeric material between the layers and facilitates further delamination of the layers when the intercalate is shear mixed with isobutylene-based elastomer matrix material to provide a uniform dispersion of the exfoliated layers within the isobutylene-based elastomer matrix.

The amount of nanofiller or exfoliated nanofiller incorporated in the nanocomposites in accordance with this invention is sufficient to develop an improvement in the mechanical properties or barrier properties of the nanocomposite, for example, tensile strength or oxygen permeability. Amounts of nanofiller in the nanocomposite generally will range from 0.1 to 10 weight percent in one embodiment, and from 0.5 to 5 weight percent in another embodiment, based on the polymer content of the nanocomposite. Expressed in parts per hundred rubber, the nanofiller or exfoliated nanofiller may be present from 0.1 to 30 phr in one embodiment, and from 0.5 to 20 phr in another embodiment.

Elastomer

The nanocomposite of the present invention includes at least one isobutylene-based elastomer comprising at least 70 mole % isobutylene derived units. The isobutylene-based elastomer can be halogenated. The elastomer may also include other monomer derived units. In one embodiment, the elastomer further includes at least one styrenic monomer, which may be any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene. In another embodiment, the elastomer further includes at least one multiolefin, which may be a $C_4$ to $C_{14}$ diene, conjugated or not, in one embodiment selected from isoprene, butadiene, 2,3-dimethyl-1,3-butadiene, myrcene, 6,6-dimethyl-fulvene, hexadiene, cyclopentadiene, methylcyclopentadiene, piperylene and combinations thereof.

In one embodiment, the isobutylene-based elastomer includes isobutylene, a multiolefin derived unit, and a styrenic derived unit. In another isobutylene-based embodiment, the elastomer includes an isobutylene derived unit and a styrenic derived unit, and in yet another embodiment the isobutylene-based elastomer includes an isobutylene derived unit and a multiolefin derived unit.

The isobutylene-based elastomers in one embodiment of the invention are random elastomeric copolymers of isobutylene and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. In another embodiment of the invention, the interpolymer is a random elastomeric copolymer of isobutylene and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. Preferred materials may be characterized as interpolymers containing the following monomer units randomly spaced along the polymer chain:

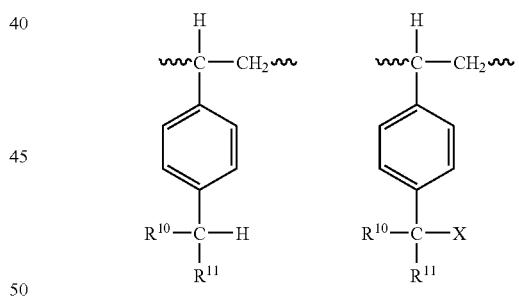

wherein $R^{10}$ and $R^{11}$ are independently hydrogen, lower alkyl, preferably $C_1$ to $C_7$ alkyl and primary or secondary alkyl halides and X is a functional group such as halogen. Preferably $R^{10}$ and $R^{11}$ are hydrogen. Up to 60 mole percent of the para-substituted styrene present in the interpolymer structure may be the functionalized structure above in one embodiment, and in another embodiment from 0.1 to 5 mole percent. In yet another embodiment, the amount of functionalized structure is from 0.4 to 1 mole percent.

The functional group X may be halogen or a combination of a halogen and some other functional group such which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; nitrile; amino and mixtures thereof. These functionalized isoolefin copolymers, their method of preparation, methods of functionalization, and cure are more particularly disclosed in U.S. Pat. No. 5,162,445.

Most useful of such functionalized materials are elastomeric random interpolymers of isobutylene and para-methylstyrene containing from 0.5 to 20 mole percent para-methylstyrene, wherein up to 60 mole percent of the methyl substituent groups present on the benzyl ring contain a bromine or chlorine atom, preferably a bromine atom (para(bromomethylstyrene)), as well as a combination of para(bromomethylstyrene) and other functional groups such as ester and ether. Examples of such halogenated elastomers are commercially available as EXXPRO™ Elastomers (ExxonMobil Chemical Company, Houston Tex.), and abbreviated as "BIMSM".

In a preferred embodiment, the functionality is selected such that it can react or form polar bonds with functional groups present in the matrix polymer, for example, acid, amino or hydroxyl functional groups, when the polymer components are mixed at high temperatures.

These functionalized interpolymers have a substantially homogeneous compositional distribution such that at least 95% by weight of the polymer has a para-alkylstyrene content within 10% of the average para-alkylstyrene content of the polymer. Desirable interpolymers are also characterized by a narrow molecular weight distribution ($M_w/M_n$) of less than 5, more preferably less than 3, a preferred viscosity average molecular weight in the range of from 200,000 up to 2,000,000 and a preferred number average molecular weight in the range of from 25,000 to 750,000 as determined by gel permeation chromatography.

The BIMSM polymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Preferred BIMSM polymers are brominated polymers that generally contain from 0.1 to 5 mole percent of bromomethylstyrene groups relative to the total amount of monomer derived units in the polymer. In another embodiment, the amount of bromomethyl groups is from 0.2 to 3.0 mole percent, and from 0.3 to 2.8 mole percent in yet another embodiment, and from 0.4 to 2.5 mole percent in yet another embodiment, and from 0.3 to 2.0 in yet another embodiment, wherein a desirable range may be any combination of any upper limit with any lower limit. Expressed another way, preferred copolymers contain from 0.2 to 10 weight percent of bromine, based on the weight of the polymer, from 0.4 to 6 weight percent bromine in another embodiment, and from 0.6 to 5.6 weight percent in another embodiment, are substantially free of ring halogen or halogen in the polymer backbone chain. In one embodiment of the invention, the interpolymer is a copolymer of isobutylene derived units (or isomonoolefin), para-methylstyrene derived units and para-(halomethylstyrene) derived units, wherein the para-(halomethylstyrene) units are present in the interpolymer from 0.4 to 3.0 mole percent based on the total number of para-methylstyrene, and wherein the para-methylstyrene derived units are present from 3 weight percent to 1.5 weight percent based on the total weight of the polymer in one embodiment, and from 4 weight percent to 10 weight percent in another embodiment. In another embodiment, the para-(halomethylstyrene) is para-(bromomethylstyrene).

The halogenated isobutylene-based elastomer useful in the present invention may also include a halogenated butyl rubber component. As used herein, "halogenated butyl rubber" refers to both butyl rubber and so-called "star-branched" butyl rubber, described below. In one embodiment of the invention, the halogenated rubber component is a halogenated copolymer of isobutylene and a multiolefin. In another embodiment, the halogenated rubber component is a blend of a polydiene or block copolymer, and a copolymer of isobutylene and a conjugated, or a "star-branched" butyl polymer. The halogenated butyl polymer useful in the present invention can thus be described as a halogenated elastomer comprising isobutylene derived units, multiolefin derived units, and halogenated multiolefin derived units, and includes both "halogenated butyl rubber" and so called "halogenated star-branched" butyl rubber.

In one embodiment, the halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R. T. Vanderbilt Co., Inc. 1990), and in RUBBER TECHNOLOGY 311-321 (Maurice Morton ed., Chapman & Hall 1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The halogenated isobutylene-based rubber component of the present invention includes, but is not limited to, brominated butyl rubber, chlorinated butyl rubber, star-branched polyisobutylene rubber, star-branched brominated butyl (polyisobutylene/isoprene copolymer) rubber; isobutylene-bromomethylstyrene copolymers such as isobutylene/meta-bromomethylstyrene, isobutylene/para-bromomethylstyrene, isobutylene/chloromethylstyrene, halogenated isobutylene cyclopentadiene, and isobutylene/para-chloromethylstyrene, and the like halomethylated aromatic interpolymers as in U.S. Pat. No. 4,074,035 and U.S. Pat. No. 4,395,506; isoprene and halogenated isobutylene copolymers, and the like, and mixtures of any of the above. Some embodiments of the halogenated rubber component are also described in U.S. Pat. No. 4,703,091 and U.S. Pat. No. 4,632,963.

More particularly, in one embodiment of the halogenated (preferably brominated) isobutylene-based rubber component of the invention, a halogenated butyl rubber is used. The halogenated butyl rubber is produced from the halogenation of butyl rubber. Preferably, the olefin polymerization feeds employed in producing the halogenated butyl rubber of the invention are those olefinic compounds conventionally used in the preparation of butyl-type rubber polymers. The butyl polymers are prepared by reacting a comonomer mixture, the mixture having at least (1) isobutylene with (2) a multiolefin, or conjugated diene, monomer component. The isobutylene is in a range from 70 to 99.5 weight percent by weight of the total comonomer mixture in one embodiment, and 85 to 99.5 weight percent in another embodiment. The conjugated diene component in one embodiment is present in the comonomer mixture from 30 to 0.5 weight percent in one embodiment, and from 15 to 0.5 weight percent in another embodiment. In yet another embodiment, from 8 to 0.5 weight percent of the comonomer mixture is conjugated diene.

The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of the butyl rubber polymer of the invention is obtained by reacting 92 to 99.5 weight percent of isobutylene with 0.5 to 8 weight percent isoprene, or reacting 95 to 99.5 weight percent isobutylene with from 0.5 to 5.0 weight percent isoprene in yet another embodiment.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the halogen is in the so called II and III structures as discussed in, for example, RUBBER TECHNOLOGY at 298-299 (1995). In one embodiment, the butyl rubber is halogenated in hexane diluent at from 40 to 60° C. using bromine ($Br_2$) or chlorine ($Cl_2$) as the halogenation agent. The halogenated butyl rubber has a Mooney Viscosity of from 20 to 70 (ML 1+8 at 125° C.) in one embodiment, and from 25 to 55 in another embodiment. The halogen content is from 0.1 to 10 weight percent based in on the weight of the halogenated butyl rubber in one embodiment, and from 0.5 to 5 weight percent in another embodiment. In yet another embodiment, the halogen weight percent of the halogenated butyl rubber is from 1 to 2.2 weight percent.

In another embodiment, the halogenated butyl or star-branched butyl rubber may be halogenated such that the halogenation is primarily allylic in nature. This is typically achieved by such means as free radical bromination or free radical chlorination, or by such methods as secondary treatment of electrophilically halogenated rubbers, such as by heating the rubber, to form the allylic halogenated butyl and star-branched butyl rubber. Common methods of forming the allylic halogenated polymer are disclosed by Gardner et al. in U.S. Pat. No. 4,632,963; U.S. Pat. No. 4,649,178; U.S. Pat. No. 4,703,091. Thus, in one embodiment of the invention, the halogenated butyl rubber is such that the halogenated multi-olefin units are primary allylic halogenated units, and wherein the primary allylic configuration is present to at least 20 mole percent (relative to the total amount of halogenated multiolefin) in one embodiment, and at least 30 mole percent in another embodiment. This arrangement can be described by the structure:

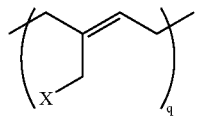

wherein X is a halogen, desirably chlorine or bromine, and q is at least 20 mole percent based on the total moles of halogen in one embodiment, and at least 30 mole percent in another embodiment, and from 25 mole percent to 90 mole percent in yet another embodiment.

A commercial embodiment of the halogenated butyl rubber of the present invention is Bromobutyl 2222 (ExxonMobil Chemical Company). Its Mooney Viscosity is from 27 to 37 (ML 1+8 at 125° C., ASTM 1646, modified), and the bromine content is from 1.8 to 2.2 weight percent. Another commercial embodiment of the halogenated butyl rubber is Bromobutyl 2255 (ExxonMobil Chemical Company). Its Mooney Viscosity is from 41 to 51 (ML 1+8 at 125° C., ASTM 1646, modified), and the bromine content is from 1.8 to 2.2 weight percent. The invention is not limited to the commercial source of any of the halogenated isobutylene-based rubber components.

In another embodiment of the brominated rubber component of the invention, a branched or "star-branched" halogenated butyl rubber is used. In one embodiment, the star-branched halogenated butyl rubber ("SBHR") is a composition of a butyl rubber, either halogenated or not, and a polydiene or block copolymer, either halogenated or not. The halogenation process is described in detail in U.S. Pat. Nos. 4,074,035, 5,071,913, 5,286,804, 5,182,333 and 6,228,978. The invention is not limited by the method of forming the SBHR. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the SBHR. The branching agent or polydiene can be any suitable branching agent, and the invention is not limited to the type of polydiene used to make the SBHR.

In one embodiment, the SBHR is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer weight percent, greater than 0.3 weight percent in one embodiment, and from 0.3 to 3 weight percent in another embodiment, and from 0.4 to 2.7 weight percent in yet another embodiment.

A commercial embodiment of the SBHR of the present invention is Bromobutyl 6222 (ExxonMobil Chemical Company), having a Mooney Viscosity (ML 1+8 at 125° C., ASTM 1646, modified) of from 27 to 37, and a bromine content of from 2.2 to 2.6 weight percent.

The halogenated isobutylene-based rubber component is present in the blend of the invention from 10 to 90 phr in one embodiment, from 20 to 80 phr in another embodiment, and from 30 to 70 phr in yet another embodiment, wherein a desirable range may be any combination of any upper phr limit with any lower phr limit.

Functionalized Halogenated Elastomers

The halogen in the above described halogenated polymer can react or form polar bonds with functional groups present in the matrix polymer, for example, acid, amino or hydroxyl functional groups, when the components are mixed at high temperatures. One embodiment of the present invention is a nanocomposite comprising a nanofiller and a halogenated elastomer comprising isobutylene derived units; wherein a portion of the halogen in the elastomer is electrophilically substituted with an amine-functionalized group such that the halogenated elastomer also comprises an amine-functionalized monomer unit described by the following group pendant to the elastomer E:

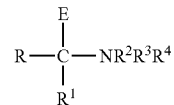

wherein R and $R^1$ are the same or different and are selected from hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions. In a desirable embodiment, at least one of $R^2$, $R^3$ and $R^1$ are selected from $C_1$ to $C_{20}$ alkenes, $C_1$ to $C_{20}$ aliphatic alcohols, $C_1$ to $C_{20}$ aliphatic ethers, $C_1$ to $C_{20}$ carboxylic acids, nitriles, ethoxylated amines, acrylates, esters and ammonium ions.

In one embodiment, the halogenated elastomer E comprises isobutylene derived units, para-methylstyrene derived units and para-(halomethylstyrene) derived units.

In another embodiment, the halogenated elastomer E comprises isobutylene derived units, multiolefin derived units, and halogenated multiolefin derived units.

The functional group pendant to the elastomer E can be further described as functionalized amine, wherein at least one of $R^2$, $R^3$ and $R^4$ is selected from $C_1$ to $C_{20}$ aliphatic alcohols or ethers, $C_1$ to $C_{20}$ carboxylic acids, nitriles, esters, ammonium ions, or acrylate groups; wherein the acrylate is described by the following formula:

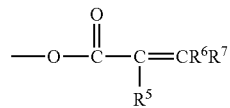

wherein $R^5$, $R^6$ and $R^7$ are the same or different and are selected from hydrogen and $C_1$ to $C_7$ alkyl or alkenyl.

In another embodiment, the amine-functionalized group is selected from ethoxylated amines having the following structure:

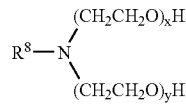

wherein $R^8$ is a $C_1$ to $C_{20}$ alkyl; and wherein x+y is 2, 5, 10, 15, or 50.

In another embodiment, the amine-functionalized group is selected from dimethylaminoethylacrylate, dimethylaminomethylacrylate, N-methylamino-bis-2-propanol, N-ethylamino-bis-2-propanol, dimethylaminoethylmethacrylate, diethylaminopropanol, diethylethanolamine, dimethylamino-1-propanol, tripropanolamine, triethanolamine, aminolauric acid, betaine, and combinations thereof.

The amine-functionalized derived unit may be present on the halogenated elastomer from 0.01 weight percent to 10 weight percent of the elastomer in one embodiment, and from 0.1 weight percent to 8 weight percent in another embodiment, and from 0.2 to 6 weight percent in yet another embodiment, wherein a desirable range may be any combination of any upper weight percent limit with any lower weight percent limit.

Polar Modified Polymer or Oligomer

A polar oligomer or polymer can be present in compositions and end use articles of the present invention. The polar polymer can increase the interaction between the isobutylene-based elastomer matrix and the nanofiller, facilitating separation, dispersion or exfoliation of nanofiller aggregates during nanocomposite processing, and thus can provide a composite with improved barrier properties. The polar component can also minimize nanofiller re-aggregation during compounding when forming end-use products. In certain embodiments, the polar polymer can have a chemical (chain backbone) composition similar to the halogenated or functionalized halogenated isobutylene-based elastomers described above to promote polymer compatibility. The polar group can be selected from alcohols, ethers, acids, anhydrides, nitriles, amines including ethoxylated amines, acrylates, esters, ammonium ions, and combinations thereof.

In one embodiment, the polar polymer can be a reaction product formed by reaction of a polymer with an acid or an acid anhydride. In other embodiments, the polar polymer can be formed by reaction of a polymer with an acid anhydride and an initiator. Although acids and acid anhydrides are referred to generally, one skilled in the art recognizes that incorporation of the acid or acid anhydride into the polymer can include derivatives and salts of the acid or acid anhydride.

In one embodiment, the polar polymer can comprise isobutylene derived units. The polar polymer may also include other monomer derived units. In one embodiment, the polar polymer includes at least one styrenic monomer, which may be any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene. In another embodiment, the polar polymer includes at least one multiolefin, which may be a $C_4$ to $C_{14}$ diene, conjugated or not, in one embodiment selected from isoprene, butadiene, 2,3-dimethyl-1,3-butadiene, myrcene, 6,6-dimethyl-fulvene, hexadiene, cyclopentadiene, methylcyclopentadiene, piperylene and combinations thereof.

In one embodiment, the polar polymer includes an isobutylene derived unit, a multiolefin derived unit, and a styrenic derived unit. In another embodiment, the polar polymer includes an isobutylene derived unit and a styrenic derived unit, and in yet another embodiment the polar polymer includes an isobutylene derived unit and a multiolefin derived unit. In other embodiments, the polar polymer can be halogenated or functionalized as described above.

In some embodiments, the acid anhydride can be an organic acid anhydride. The acid anhydride can be a carboxylic acid anhydride of one of the following general formulae:

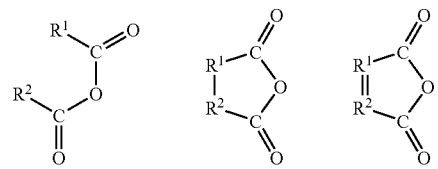

where $R^1$ and $R^2$ can be the same or different and are selected from $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, nitriles, ethoxylated amines, acrylates, esters and ammonium ions. In some embodiments the acid anhydride can be maleic anhydride. In other embodiments the acid anhydride can be succinic anhydride.

In other embodiments, the acid anhydride can be a phosphoric acid anhydride or a thioanhydride. In yet other embodiments, the polar group can be a carboxamide.

In some embodiments, the acid can be an organic acid. The acid can be a carboxylic acid, a dicarboxylic acid, a tricarboxylic acid, an oxo carboxylic acid, a peroxy acid, and the like. In other embodiments, the acid can be a thiocarboxylic acid, a sulfonic acid, a sulfinic acid, a xanthic acid, sulfenic acid, sulfamic acid, a phosphonic acid, an amic acid, an azinic acid, an azonic acid, a hydroxamic acid, an imidic acid, an imino acid, a nitrosolic acid, a nitrolic acid, a hydrazonic acid, or mixtures thereof. A preferred acid is maleic acid.

In other embodiments, the polar oligomer or polymer can be formed by reaction of a polymer with an acid anhydride and an initiator. In a particular embodiment, an initiator may be a member of the peroxide family. Particularly useful peroxides include peresters, perketals, and peroxycarbonates. In some embodiments, the peroxide can be a peroxybenzoate. Commercial quantities of these compounds can be obtained from Akzo Nobel, Arkema, Aztec, and others. As is well known to one skilled in the art, such peroxides are selected on the basis of their decomposition rates at different temperatures. Such half-life information is available from the suppliers. The concentration of initiator used to react the polymer and the acid or acid anhydride can range from about 0 ppm to about 600 ppm or more. In still other embodiments of the present invention the initiator may include a combination of initiators. One of ordinary skill in the art will realize that these concentrations are not limiting and any concentrations yielding a polymer product with the desirable properties may be employed.

For example, in some embodiments, the polar polymer can be a polyisobutylene succinic anhydride, a reaction product of polyisobutylene and succinic anhydride. In other embodiments, the polar oligomer or polymer can be a reaction product of the halogenated elastomer described above and maleic anhydride. In other embodiments, the halogenated elastomer and maleic anhydride are reacted in the presence of an initiator such as tert-butyl peroxybenzoate for example.

The acid or acid anhydride derived unit may be present on the polymer from 0.01 weight percent to 10 weight percent of the polymer in one embodiment, and from 0.1 weight percent to 8 weight percent in another embodiment, from 0.2 to 7 weight percent in yet another embodiment, from 0.2-5.0 weight percent in another embodiment, and from 0.3-3.0 weight percent in another embodiment, wherein a desirable range may be any combination of any upper weight percent limit with any lower weight percent limit. Where the elastomer may contain functional groups, the polar polymer can contain a higher content of functional groups and/or a different functional group or groups, e.g. a type of functional group that is more polar than the functional groups of the elastomer, so as to improve exfoliation, intercalation, gas barrier properties, and polymer blend compatibility.

In certain embodiments, the nanocomposite of the present invention can include a halogenated isobutylene-based elastomer and a polar polymer, where the polar polymer can enhance exfoliation, blend compatibility, and gas barrier properties without the need for additional functionalization of the halogenated elastomer, as described above. In addition to eliminating process steps, minimizing or avoiding functionalization of the halogenated elastomer can enhance the curability of the composite as the aromatic halomethyl groups provide a wide choice of crosslinking reactions that can be used.

The interactions between the polar polymers and between the polar polymers and other components of the nanocomposite of the present invention can enhance air barrier properties. Polar or other ionic interactions between the composite molecules can limit the area through which oxygen or other gases can permeate, thus improving the barrier properties of the composite.

In some embodiments, suitable polar polymers derived from an isomonoolefin and an acid or acid anhydride include polymers having a number average molecular weight (Mn) of at least about 1,000, preferably at least about 10,000, more preferably at least about 30,000. The copolymers also, preferably, have a ratio of weight average molecular weight (Mw) to number average molecular weight (Mn), i.e., Mw/Mn of less than about 6, preferably less than about 4, more preferably less than about 3.

In other embodiments, suitable polar oligomers or low polymers have a number average molecular weight (Mn) of at least about 500, preferably at least about 1,000, more preferably at least about 2000. The oligomers also, preferably, have a ratio of weight average molecular weight (Mw) to number average molecular weight (Mn), i.e., Mw/Mn of less than about 6, preferably less than about 4, more preferably less than about 2.5.

The isobutylene-based elastomer component of the nanocomposites of the present invention may further comprise another polymer or isobutylene-based elastomer (as described above), or may comprise any combination of at least two or more isobutylene-based elastomers as described above. In an embodiment, the isobutylene-based elastomer component further comprises at least one other rubber.

In another embodiment of the invention, the low molecular weight polymer or oligomer is a polyamide chosen from the group consisting of polyamide-6, polyamide-6,6, polyamide-11, polyamide-12, and the blends and copolymers based on these polyamides.

Secondary Rubber Component

A secondary rubber (for example "general purpose rubber") component may be present in compositions and end use articles of the present invention. These rubbers include, but are not limited to, natural rubbers, polyisoprene rubber, poly (styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers. The composition may also include isobutylene based elastomers in addition to those described above, including star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

A desirable embodiment of the secondary rubber component present is natural rubber. Natural rubbers are described in detail by Subramaniam in RUBBER TECHNOLOGY 179-208 (Maurice Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of a high cis-polybutadiene commercial product used in the composition is BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber is commercially available as VISTALON™ (ExxonMobil Chemical Company, Houston Tex.).

In another embodiment, the secondary rubber is a halogenated rubber as part of a terpolymer composition. The halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R. T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrPMS), and the like halomethylated aromatic interpolymers as in U.S. Pat. No. 5,162,445; U.S. Pat. No. 4,074,035; and U.S. Pat. No. 4,395,506; halogenated isoprene and halogenated isobutylene copolymers, polychloroprene, and the like, and mixtures of any of the above. Some embodiments of the halogenated rubber component are also described in U.S. Pat. No. 4,703,091 and U.S. Pat. No. 4,632,963.

In one embodiment of the invention, a so called semi-crystalline copolymer ("SCC") is present as the secondary "rubber" component. Semi-crystalline copolymers are described in WO00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The secondary rubber component of the elastomer composition may be present in a range from up to 90 phr in one embodiment, from up to 50 phr in another embodiment, from up to 40 phr in another embodiment, and from up to 30 phr in yet another embodiment. In yet another embodiment, the secondary rubber is present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit. For example, the secondary rubber, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Fillers, Curatives and Other Additives

The composition of the invention may also include one or more filler components such as calcium carbonate, clay, mica, silica and silicates, talc, titanium dioxide, wollastonite, and carbon black. As used herein, fillers do not include inorganic nanofiller and/or organonanofiller particles forming part of the nanocomposite matrix, e.g. nanofiller particles having a dimension in the nanometer range, but larger particles can be used as a filler in the nanocomposites, if desired. In one embodiment, the filler is carbon black or modified carbon black. A preferred filler is semi-reinforcing grade carbon black present at a level of from 10 to 150 phr of the blend, more preferably from 30 to 120 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires are N330, N351, N550, N650, N660, and N762. Embodiments of the carbon black useful in, for example, innerliners for tires are N550, N650, N660, N762, and N990.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2,4,6-trimercapto-5 triazine), ZDEDC (zinc diethyl dithiocarbamate) and other dithiocarbamates, Tetrone A (dipenta-methylene thiuram hexasulfide); Vultac-5 (alkylated phenol disulfide), SP1045 (phenol formaldehyde resin), SP1056 (brominated alkyl phenol formaldehyde resin), DPPD. (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Blending of the fillers, additives, and/or curative components may be carried out by combining the desired components and the nanocomposite of the present invention in any suitable mixing device such as a Banbury™ mixer, Brabender™ mixer or preferably a mixer/extruder and mixing at temperatures in the range of 60° C. up to 200° C. under conditions of shear sufficient to allow the components to become uniformly dispersed within the polymer to form the nanocomposite.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, and automotive (including truck, commercial and/or passenger) or aircraft innerliners and innertubes.

Nanocomposite Processing

Nanocomposites can be formed using a variety of processes. For example, one method for preparing nanofiller-butyl rubber nanocomposites starts from an emulsion of butyl rubber solution and aqueous nanofiller dispersion in which the nanofiller can be zirconium phosphate. Another example of nanocomposite processing, as mentioned above, includes preparing nanofiller-butyl rubber nanocomposites by preparing a concentrated nanocomposite from a slipstream of the rubber and blending the concentrate with a main rubber stream.

Melt Blending:

The nanocomposite of the present invention can be formed by a polymer melt blending process. Blending of the components can be carried out by combining the isobutylene-based elastomer and optional other polymer components and the nanofiller in the form of an intercalate in any suitable mixing device such as a BANBURY™ mixer, BRABENDER™ mixer or preferably a mixer/extruder, such as a intermeshing or non-intermeshing co or counter-rotating twin screw extruder, and mixing at temperatures in the range of 80° C. up to 300° C. under conditions of shear sufficient to allow the nanofiller intercalate to exfoliate and become uniformly dispersed within the isobutylene-based elastomer to form the nanocomposite.

Emulsion Processes:

The nanocomposite of the present invention can also be formed by an emulsion processes. In one embodiment, the emulsion process can comprise mixing an aqueous slurry of nanofiller with a isobutylene based-elastomer solution (cement). The mixing should be sufficiently vigorous to form emulsions or micro-emulsions. In some embodiments, the emulsions can be formed as an aqueous solution or suspension in an organic solution. Standard methods and equipment for both lab and large-scale production, including batch and continuous processes may be used to produce the polymeric nanocomposites of the invention.

In certain embodiments, a nanocomposite is produced by a process comprising contacting Solution A comprising water and at least one layered nanofiller with Solution B comprising a solvent and at least one isobutylene-based elastomer; and removing the solvent and water from the contact product of Solution A and Solution B to recover a nanocomposite. In certain embodiments, the emulsion is formed by subjecting the mixture to agitation using a high-shear mixer.

In some embodiments, a nanocomposite is produced by a process comprising contacting Solution A comprising water and at least one layered nanofiller with Solution B comprising a solvent and at least one isobutylene-based elastomer, wherein the contacting is performed in the presence of an emulsifier or surfactant.

The emulsions of the present invention are formed by conventional emulsion technology, that is, subjecting a mixture of the hydrocarbon, water and surfactant, when used, to sufficient shearing, as in a commercial blender or its equivalent for a period of time sufficient for forming the emulsion, e.g., generally at least a few seconds. For general emulsion information, see generally, "Colloidal Systems and Interfaces", S. Ross and T. D. Morrison, J. W. Wiley, NY, 1988. The emulsion can be allowed to remain in emulsion form, with or without continuous or intermittent mixing or agitation, with or without heating or other temperature control, for a period sufficient to enhance exfoliation of the nanofiller, from 0.1 to 100 hours or more in one embodiment, from 1 to 50 hours in another embodiment, and from 2 to 20 hours in another embodiment.

When used, the surfactant concentration is sufficient to allow the formation of a relatively stable emulsion. Preferably, the amount of surfactant employed is at least 0.001 weight percent of the total emulsion, more preferably about 0.001 to about 3 weight percent, and most preferably 0.01 to less than 2 weight percent.

Cationic surfactants useful in preparing the emulsions of this invention include tertiary amines, diamines, polyamines, amine salts, as well as quaternary ammonium compounds. Non-ionic surfactants useful in preparing the emulsions of this invention include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates.

Solution Blending:

The nanocomposite of the present invention can also be formed by solution blending as mentioned above. In certain embodiments, a nanocomposite is produced by a process comprising contacting Solution A comprising a solvent comprising a hydrocarbon and at least one layered filler or metal phosphate with Solution B comprising a solvent and at least one isobutylene-based elastomer, and removing the solvents from the contact product of Solution A and Solution B to form a nanocomposite.

In the previous embodiments, the layered filler may be a layered nanofiller treated with organic molecules as described above. In yet another embodiment, a nanocomposite is produced by a process comprising contacting at least one isobutylene-based elastomer and at least one layered filler in a solvent; and removing the solvent from the contact product to form a nanocomposite.

In another embodiment, a nanocomposite is produced by a process comprising contacting at least one isobutylene-based elastomer and at least one layered filler in a solvent mixture comprising two solvents; and removing the solvent mixture from the contact product to form a nanocomposite.

In still another embodiment, a nanocomposite is produced by a process comprising contacting at least one isobutylene-based elastomer and at least one layered filler in a solvent mixture comprising at least two or more solvents; and removing the solvent mixture from the contact product to form a nanocomposite.

In another embodiment, a nanocomposite is produced by a process to form a contact product comprising dissolving at least one isobutylene-based elastomer and then dispersing at least one layered filler in a solvent or solvent mixture comprising at least two solvents; and removing the solvent mixture from the contact product to form a nanocomposite.

In yet another embodiment, a nanocomposite is produced by a process to form a contact product comprising dispersing at least one layered filler and then dissolving at least one isobutylene-based elastomer in a solvent or solvent mixture comprising at least two solvents; and removing the solvent mixture from the contact product to form a nanocomposite.

In the embodiments described above, solvents may be present in the production of the nanocomposite composition from 30 to 99 wt %, alternatively from 40 to 99 wt %, alternatively from 50 to 99 wt %, alternatively from 60 to 99 wt %, alternatively from 70 to 99 wt %, alternatively from 80 to 99 wt %, alternatively from 90 to 99 wt %, alternatively from 95 to 99 wt %, based upon the total wt of the composition.

Additionally, in certain embodiments, when two or more solvents are prepared in the production of the nanocomposite composition, each solvent may comprise from 0.1 to 99.9 vol %, alternatively from 1 to 99 vol %, alternatively from 5 to 95 vol %, and alternatively from 10 to 90 vol %, with the total volume of all solvents present at 100 vol %.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, and automotive (including truck, commercial and/or passenger) or aircraft innerliners and innertubes.

This invention further relates to:

1. A nanocomposite comprising:
    a platy nanofiller of a metal phosphate blended in an isobutylene-based elastomer, wherein phosphate protons are exchanged with an organic compound capable of hydrogen bonding with the phosphate.
2. The nanocomposite of paragraph 1 wherein the nanofiller comprises platelets having an aspect ratio of 200 or more.
3. The nanocomposite of paragraph 1 wherein the nanofiller comprises platelets having an aspect ratio of 375 or more.
4. The nanocomposite of paragraph 1 wherein the nanofiller comprises platelets having an aspect ratio of 500 or more.
5. The nanocomposite of any one of paragraphs 1-4 wherein the metal phosphate comprises titanium phosphate.
6. The nanocomposite of any one of paragraphs 1-4 wherein the metal phosphate comprises alpha-zirconium phosphate.
7. The nanocomposite of any one of paragraphs 1-6 comprising from 0.1 to 30 phr of the nanofiller.

8. The nanocomposite of any one of paragraphs 1-7 wherein the nanofiller is intercalated.
9. The nanocomposite of any one of paragraphs 1-7 wherein the nanofiller is exfoliated in the elastomer.
10. The nanocomposite of any one of paragraphs 1-7 wherein the nanofiller is a mixture of intercalated nanofiller and partially exfoliated nanofiller in the elastomer.
11. The nanocomposite of paragraph 10 wherein from 0.0001 to 10 volume percent of the nanofiller is exfoliated.
12. The nanocomposite of paragraph 10 wherein from 0.005 to 5 volume percent of the nanofiller is exfoliated.
13. The nanocomposite of any one of paragraphs 1-12 wherein the phosphate-hydrogen-bonding organic compound comprises an amine.
14. The nanocomposite of paragraph 13 wherein the nanofiller is amine-exchanged in an amount effective to intercalate the nanofiller.
15. The nanocomposite of paragraph 13 wherein the nanofiller is amine-exchanged in an amount of at least 25 but less than 100 percent of exchange capacity of the nanofiller.
16. The nanocomposite of paragraph 13 wherein the nanofiller is amine-exchanged at from 25 to 50 percent of exchange capacity of the nanofiller.
17. The nanocomposite of any one of paragraphs 13-16 wherein the amine comprises a monoamine.
18. The nanocomposite of any one of paragraphs 13-17 wherein the amine comprises a primary amine.
19. The nanocomposite of any one of paragraphs 13-18 wherein the amine comprises a secondary amine.
20. The nanocomposite of any one of paragraphs 13-19 wherein the amine comprises a tertiary amine.
21. The nanocomposite of any one of paragraphs 13-20 wherein the amine comprises a quaternary amine.
22. The nanocomposite of any one of paragraphs 13-21 wherein the amine comprises a short chain alkylamine.
23. The nanocomposite of any one of paragraphs 13-22 wherein the amine comprises a long chain alkylamine.
24. The nanocomposite of any one of paragraphs 13-23 wherein the amine is exchanged in an overlapping configuration between opposing phosphate surfaces.
25. The nanocomposite of any one of paragraphs 13-23 wherein the amine is exchanged in a double layer configuration between opposing phosphate surfaces.
26. The nanocomposite of any one of paragraphs 13-25 wherein the amine comprises a diamine.
27. The nanocomposite of paragraph 26 wherein the diamine comprises two primary amine groups.
28. The nanocomposite of paragraph 26 or 27 wherein the diamine comprises a primary amine group and a tertiary amine.
29. The nanocomposite of paragraph 28 wherein a ratio of amine to exchangeable phosphate groups is less than 1 and the primary amine is predominantly attached to the phosphate.
30. The nanocomposite of paragraph 28 wherein a ratio of amine to exchangeable phosphate groups is greater than 1 and the tertiary amine is predominantly attached to the phosphate.
31. The nanocomposite of paragraph 28 wherein a ratio of amine to exchangeable phosphate groups is between 0.5 and 2 and the amine attachment to the phosphate is heterogeneous.
32. The nanocomposite of any one of paragraphs 13-31 wherein the amine comprises an amine-terminated oligoamide.
33. The nanocomposite of paragraph 32 wherein the oligoamide comprises from 2 to 4 monomer units.
34. The nanocomposite of paragraph 33 wherein the oligoamide monomer units comprise from 2 to 12 carbons per unit.
35. The nanocomposite of any one of paragraphs 32, 33 or 34 wherein the oligoamide comprises a molecular weight from 150 to 2000 Daltons.
36. The nanocomposite of any one of paragraphs 13-35 wherein the amine comprises a mixture of monoamine and diamine in a molar ratio of monoamine:diamine from 1:20 to 20:1.
37. The nanocomposite of paragraph 36 wherein the monoamine comprises a primary amine and the diamine comprises a primary amine group and a tertiary amine group.
38. The nanocomposite of paragraph 36 or 37 wherein the diamine comprises a mixture of primary-tertiary diamine and primary-secondary diamine.
39. The nanocomposite of any one of paragraphs 36, 37 or 38 wherein the nanofiller is amine-exchanged at from 25 to 50 percent of exchange capacity and a molar ratio of monoamine to diamine is from 1:1 to 20:1.
40. The nanocomposite of paragraph 39 wherein the molar ratio of monoamine to diamine is from 3:1 to 10:1.
41. The nanocomposite of any one of paragraphs 13-40 further comprising a dispersant aid comprising a low molecular weight polymer or oligomer functionalized with a polar group and blended in a matrix of the elastomer.
42. The nanocomposite of paragraph 41 wherein the dispersant aid comprises a polymer or oligomer of a $C_4$-$C_8$ isoolefin.
43. The nanocomposite of paragraph 42 wherein the isoolefin in the low molecular weight polymer or oligomer comprises isobutylene.
44. The nanocomposite of any one of paragraphs 41-43 wherein the dispersant aid comprises an interpolymer of a $C_4$-$C_7$ isoolefin and an alkylstyrene.
45. The nanocomposite of any one of paragraphs 41-44 wherein the dispersant aid comprises a polyamide with terminal amine groups.
46. The nanocomposite of paragraph 45 wherein the polyamide comprises polyoxyalkylenediamine polyamide obtained as the reaction product of a polyoxyalkylenediamine and a dicarboxylic acid.
47. The nanocomposite of any one of paragraphs 41-46 wherein the low molecular weight polymer or oligomer has a number average molecular between 500 and 50000.
48. The nanocomposite of any one of paragraphs 41-46 wherein the low molecular weight polymer or oligomer has a number average molecular between 2000 and 25000.
49. The nanocomposite of any one of paragraphs 41-48 wherein the polar group comprises from 0.1 to 10 weight percent of the polymer or oligomer.
50. The nanocomposite of any one of paragraphs 41-48 wherein the polar group comprises from 0.5 to 7.0 weight percent of the low molecular weight polymer or oligomer.
51. The nanocomposite of any one of paragraphs 41-50 wherein a weight ratio of the functionalized low molecular weight polymer or oligomer to the elastomer is between 0.01:1 and 1:1.
52. The nanocomposite of any one of paragraphs 41-50 wherein a weight ratio of the functionalized low molecular weight polymer or oligomer to the elastomer is between 0.05:1 and 0.5:1.
53. The nanocomposite of any one of paragraphs 41-52 wherein the low molecular weight polymer or oligomer is functionalized with the polar group selected from the

31 group consisting of alcohols, ethers, acids, anhydrides, nitriles, amines, acrylates, esters, ammonium ions, and combinations thereof.

54. The nanocomposite of paragraph 53 wherein the low molecular weight polymer or oligomer is functionalized with a primary amine.

55. The nanocomposite of paragraph 53 or 54 wherein the low molecular weight polymer or oligomer is functionalized with a secondary amine.

56. The nanocomposite of paragraph 53, 54, or 55 wherein the low molecular weight polymer or oligomer is functionalized with a tertiary amine.

57. The nanocomposite of any one of paragraphs 53-56 wherein the low molecular weight polymer or oligomer is functionalized with a quaternary amine.

58. The nanocomposite of any one of paragraphs 53-57 wherein the low molecular weight polymer or oligomer is functionalized with the polar group derived from an acid anhydride selected from the group consisting of cyclic anhydride, symmetric anhydride, mixed anhydride, and combinations thereof.

59. The nanocomposite of paragraph 58 wherein the acid anhydride is selected from the group consisting of carboxylic anhydride, thioanhydride, phosphoric anhydride, and combinations thereof.

60. The nanocomposite of paragraph 58 wherein the acid anhydride is a carboxylic acid anhydride.

61. The nanocomposite of paragraph 60 wherein the carboxylic acid anhydride is maleic anhydride, succinic anhydride, or a combination thereof.

62. The nanocomposite of any one of paragraphs 53-61 wherein the low molecular weight polymer or oligomer is functionalized with the polar group derived from an acid selected from the group consisting of carboxylic acid, dicarboxylic acid, tricarboxylic acid, oxo carboxylic acid, peroxy acid, thiocarboxylic acid, sulfonic acid, sulfinic acid, xanthic acid, sulfenic acid, sulfamic acid, phosphonic acid, amic acid, azinic acid, azonic acid, hydroxamic acid, imidic acid, imino acid, nitrosolic acid, nitrolic acid, hydrazonic acid, and combinations thereof.

63. The nanocomposite of any one of paragraphs 41-62 wherein the low molecular weight polymer or oligomer is grafted to an exchanged-amine on the phosphate.

64. The nanocomposite of paragraph 63 wherein the grafting is obtained by reaction between the exchanged amine and the polar group on the low molecular weight polymer or oligomer.

65. The nanocomposite of paragraph 64 wherein the grafting reaction forms an amide linkage between a free amine group in the exchanged amine and an acid functional group on the low molecular weight polymer or oligomer.

66. The nanocomposite of any one of paragraphs 1-65 wherein the elastomer comprises an interpolymer of a isobutylene and an alkylstyrene.

67. The nanocomposite of paragraph 66 wherein the elastomer has a number average molecular weight between 25000 and 500000.

68. The nanocomposite of paragraph 66 wherein the elastomer has a number average molecular weight of at least 100000.

69. The nanocomposite of any one of paragraphs 66, 67 or 68 wherein the elastomer comprises functional groups selected from the group consisting of halides, ethers, amines, amides, esters, acids, and hydroxyls.

70. The nanocomposite of any one of paragraphs 13-64 wherein the elastomer is functionalized with an amine.

71. The nanocomposite of any one of paragraphs 1-70 wherein the elastomer is halogenated with bromine or chlorine.

32

72. The nanocomposite of paragraph 71 wherein the elastomer comprises halogenated polyisobutylene.

73. The nanocomposite of paragraph 71 wherein the elastomer comprises a halogenated copolymer of isobutylene and para-methylstyrene.

74. The nanocomposite of any one of paragraphs 1-73 wherein the elastomer is halogenated and functionalized with an amine.

75. The nanocomposite of any one of paragraphs 1-74 wherein the elastomer comprises a polymer chain E comprising an ammonium-functionalized group wherein the ammonium functionalized group is described by the following group pendant to the polymer chain E:

$$R-\underset{\underset{R^1}{|}}{\overset{\overset{E}{|}}{C}}-NR^2R^3R^4$$

wherein R and $R^1$ are the same or different and are one of a hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions.

76. The nanocomposite of any one of paragraphs 1-75 further comprising a filler selected from calcium carbonate, mica, silica, silicates, talc, titanium dioxide, carbon black, and mixtures thereof.

77. The nanocomposite of any one of paragraphs 1-76 further comprising dye, pigment, antioxidant, heat and light stabilizer, plasticizer, oil, or mixture thereof.

78. The nanocomposite of any one of paragraphs 1-77 further comprising organic peroxide, zinc oxide, zinc stearate, stearic acid, an accelerator, a vulcanizing agent, or mixture thereof.

79. A method to form a nanocomposite comprising the step of dispersing amine-modified zirconium phosphate nanofiller in a halogenated isobutylene-based-elastomer under conditions effective to at least partially exfoliate the nanofiller.

80. The method of paragraph 79 wherein the dispersion step comprises intercalating the nanofiller and blending the intercalated nanofiller with the halogenated elastomer.

81. The method of paragraph 80 wherein the dispersion step further comprises melt blending the intercalated nanofiller with the halogenated elastomer.

82. The method of paragraph 80 or 81 wherein the dispersion step further comprises solution blending the intercalated nanofiller with the halogenated elastomer.

83. The method of paragraph 80, 81 or 82 wherein the dispersion step further comprises blending an aqueous dispersion of the intercalated nanofiller with a solution of the halogenated elastomer in a solvent immiscible with water.

84. The method of paragraph 83 wherein the water is dispersed in a continuous phase comprising the halogenated elastomer solution.

85. The method of any one of paragraphs 80-84 wherein the dispersion step further comprises high shear conditions.

86. The method of any one of paragraphs 79 to 85 comprising incorporating a curative into the nanocomposite.

87. The method of paragraph 86 further comprising curing the nanocomposite.

88. In a process to manufacture a nanocomposite comprising an isobutylene-based elastomer and nanofiller, the improvement wherein the nanofiller comprises partially exfoliated, partially intercalated amine-exchanged zirconium phosphate.

Permeability Testing

For each of the following examples, the nanocomposites formed were analyzed for permeability properties using the following method. The rubber was loaded into a Brabender™ mixer at a temperature of 130-145° C. and mixed with the stated amounts of nanofiller and carbon black (N330) for 7 minutes. The mixture was further mixed with 3 phr of a curatives package of equal parts by weight of stearic acid (HSt), zinc oxide (ZnO), and zinc dimethyl dithiocarbamate (ZDMDC), at 40° C. and 40 rpm for 3 minutes. The resulting rubber compounds were milled, compression molded and cured at 170° C. All specimens were compression molded with slow cooling to provide defect free pads. A compression and curing press was used for rubber samples. Typical thickness of a compression molded pad is around 0.4 mm (15 mil) using an Arbor press, and 25.8 mm (2 in.) diameter disks were then punched out from molded pads for permeability testing. These disks were conditioned in a vacuum oven at 60° C. overnight prior to the measurement. Disks thus prepared were mounted on a template and sealed with vacuum grease. 68.9 kPa (10 psi) nitrogen was kept on one side of the disk, whereas the other side is 68.9 kPa (10 psi) psi oxygen. Using the oxygen sensor on the nitrogen side, increase in oxygen concentration on the nitrogen side with time could be monitored. The time required for oxygen to permeate through the disk, or for oxygen concentration on the nitrogen side to reach a constant value, is recorded and used to determine the oxygen permeability. The oxygen permeation measurements were done using a Mocon™ OX-TRAN 2/61 permeability tester at 40° C. under the principle of R. A. Pasternak et. al. in 8 JOURNAL OF POLYMER SCIENCE: PART A-2 467 (1970). Where multiple samples were prepared using the same procedure, permeation rates are given for each sample.

In certain embodiments, a useful formulation for property evaluation would be as follows:

| Material I.D. | Parts |
| --- | --- |
| Elastomer/Nanofiller | 100 + x parts of nanofiller |
| Carbon black N330 | 60.0 |
| Stearic Acid | 1.0 |

-continued

| Material I.D. | Parts |
| --- | --- |
| ZnO KADOX 911 | 1.0 |
| MBTS | 1.0 |

Carbon black N330 can be obtained from, e.g., Cabot Corp. (Billerica, Mass.). Stearic acid, a cure agent, can be obtained from, e.g., C. K. Witco Corp. (Taft, La.), KADOX® 911, an activator, can be obtained from C. P. Hall (Chicago, Ill.). MBTS, 2-mercaptobenzothiazole disulfide, can be obtained from R. T. Vanderbilt (Norwalk, Conn.) or Elastochem (Chardon, Ohio).

Polyisobutylene succinic anhydride (PIBSA) preferably has a number average molecular weight ranging from 600 to about 2200.

EXAMPLES

Case 1: 100 phr of BIMSM rubber was compounded with and without primary-primary diamine-treated zirconium phosphates (ZrP) and samples were tested for oxygen permeability. The BIMSM rubber (BIMSM A) had a para-methylstyrene (PMS) content of 10 wt %, and a benzylic bromine content of 0.85 mol % and a Mooney viscosity of about 32(ML 1+8, 125° C., ASTM 1646. ZrP-HMDA-30-200 was a zirconium phosphate 30% exchanged with hexamethylene diamine with a platelet thickness of 6.3 Å, length of 150-200 nm and aspect ratio greater than 250, and an aggregate particle thickness of 50 nm and length of 150-200 nm (approximately 40 layers per particle, surface area about 20 m$^2$/g), and ZrP-HMDA-30-400 was a similar zirconium phosphate 30% exchanged with a platelet thickness of 6.3 Å, length of 150-400 nm and aspect ratio greater than 500, and an aggregate particle thickness of 20 nm and length of 150-400 nm (approximately 15 layers per particle, surface area about 35 m$^2$/g). The nanofiller Zr—P was blended at 2 wt % (based upon the weight of the composition), with an HSt/ZnO/ZDMDC curing system at 2/2/2 phr. The rubber was loaded into a Brabender® mixer at a temperature of 100-120° C. and mixed with the Zr—P for 7 minutes. The mixture was further mixed with the curatives package of equal parts by weight of stearic acid (HSt), zinc oxide (ZnO), and zinc dimethyl dithiocarbamate (ZDMDC), at 90° C. and 40 rpm for 3 minutes. The resulting rubber compounds were milled, compression molded and cured at 170° C. Pads were then prepared and tested as described above.

The permeability results are presented in Table 1 below.

TABLE 1

| Example | Elastomer | Nanofiller | Nanofiller, wt % | Exchange, % | Aspect ratio | Permeation Rate (cc*mm/m$^2$*day*mmHg) |
| --- | --- | --- | --- | --- | --- | --- |
| Cp. 1 | BIMSM A | none | 0 | | | 0.205 |
| 1 | BIMSM A | ZrP-HMDA-30-200 | 2 | 30 | low (150-200) | 0.134 |
| 2 | BIMSM A | ZrP-HMDA-30-400 | 2 | 30 | high (150-400) | 0.131 |

Examples 1 and 2 demonstrate that the addition of the zirconium phosphate nanofiller according to the present invention reduced the permeability by 35% in these examples.

Case 2: 100 phr of a BIMSM rubber was compounded with and without a primary-tertiary diamine-treated zirconium phosphate (ZrP) and samples were tested for oxygen permeability. The BIMSM elastomer was BIMSM A as described above. ZrP-APM-100-400 was a zirconium phosphate 100% exchanged with N-3-aminopropyl-morpholine with a platelet aspect ratio of 150-400. N330 carbon black was added at 37 phr. The Zr—P was blended at 4 wt %, with an HSt/ZnO/MBTS curing system at 1/1/1 phr. The rubber was loaded into a Brabender® mixer at a temperature of 100-120° C. and mixed with the Zr—P and the carbon black for 7 minutes. The mixture was further mixed with the curatives package of equal parts by weight of stearic acid (HSt), zinc oxide (ZnO), and zinc dimethyl dithiocarbamate (ZDMDC), at 90° C. and 40 rpm for 3 minutes. The resulting rubber compounds were milled, compression molded and cured at 170° C. Pads were then prepared and tested as described above.

The permeability results are presented in Table 2 below.

TABLE 2

| Example | Elastomer | Nanofiller | Nanofiller, wt % | Exchange, % | Aspect ratio | Permeation Rate (cc*mm/m$^2$*day*mmHg) |
|---|---|---|---|---|---|---|
| Cp. 2 | BIMSM A | none | 0 | | | 0.160 |
| 3 | BIMSM A | ZrP-HMDA-100-400 | 4 | 100 | high (150-400) | 0.117 |

Example 3 demonstrates that the addition of the zirconium phosphate nanofiller according to the present invention reduced the permeability by 27% in this example.

Prophetic Examples 4-11

Cyclohexane (1.7 L) is added to a jacketed glass reactor and heated to 60° C. About 192 to 200 grams of BIMSM elastomer A (described above) are then added to the heated reactor. After all of the elastomer is completely dissolved, 16 grams of ZrP-APM-50-400 (a zirconium phosphate 50% exchanged with N-3-aminopropyl-morpholine with a platelet aspect ratio of about 50 to 400) and 4 or 8 grams of polyisobutylene succinic anhydride (PIBSA) in 50 mL of cyclohexane are added to the reactor and stirred for 40 minutes to form a cement. (The PIBSA is a polyisobutylene succinic anhydride having an Mw of 2,200 and about 2.5 mole % succinic anhydride.) The cement is then poured out and the solvent evaporated. The residual solid is dried under vacuum at 100° C. overnight to form a nanofiller-rubber mixture.

Forty (40) grams of the dried nanofiller-rubber mixture are loaded into a Brabender™ mixer. After adding carbon black N330 (22.2.grams), the mixture is mixed for 6 minutes at 140° C. and 60 rpm, and then discharged from the mixer. The mixer is then cooled to 50° C. and the discharged mixture is reloaded into the Brabender™ mixer and mixed at 50° C. and 40 rpm for 30 seconds. Curatives (Stearic Acid, 0.37 grams; KADOX® 911, 0.37 grams; MBTS, 0.37 grams) are then added to the Brabender™ mixer and the components are mixed for 4 minutes at 50° C. The material is then collected and formed into pads for permeation measurement as described above. The formulations are reported in Table 3.

TABLE 3

Formulations for Examples 4-11.

| Example | BIMSM (grams) | Nanofiller Type | PIBSA 48 (grams) |
|---|---|---|---|
| 4 | 200 | ZrP-APM-50-400 | 0 |
| 5 | 196 | ZrP-APM-50-400 | 4 |
| 6 | 192 | ZrP-APM-50-400 | 8 |
| 7 | 200 | ZrP-APM-50-400 | 0 |
| 8 | 196 | ZrP-APM-50-400 | 4 |
| 9 | 192 | ZrP-APM-50-400 | 8 |
| 10 | 200 | ZrP-APM-50-400 | 0 |
| 11 | 196 | ZrP-APM-50-400 | 4 |
| 12 | 192 | ZrP-APM-50-400 | 8 |
| 13 | 200 | ZrP-APM-50-400 | 0 |
| 14 | 196 | ZrP-APM-50-400 | 4 |
| 15 | 192 | ZrP-APM-50-400 | 8 |

Prophetic Examples 16-17

The Brabender™ mixer is heated to 150° C. and set for 60 rpm. About 45 grams of BIMSM A and 0.92 or 1.84 grams of PIBSA (both described above) are loaded into the Brabender™ mixer and mixed for one minute. 4 phr of ZrP-APM-50-400 (described above) is added to the mixture and mixed for 8 minutes. The resulting mixture is then recovered from the mixer. 36 grams of the recovered mixture is loaded into the Brabender™ mixer and mixed with carbon black (N330, 20 grams) for 8 minutes at 150° C. and 60 rpm. Curatives are then added to the mixture (stearic acid, KADOX® 911, and MBTS, 0.33 grams each) and stirred at 40° C. and 40 rpm for 3 minutes. The material is then collected and formed into pads for permeation measurement as described above; formulations are detailed in Table 4 below.

TABLE 4

Formulations for Examples 16-17.

| Example | BIMSM (grams) | ZrP Type | PIBSA 48 (grams) |
|---|---|---|---|
| 16 | 45.08 | ZrP-APM-50-400 | 0.92 |
| 17 | 44.16 | ZrP-APM-50-400 | 1.84 |

Prophetic Examples 18-19

Fifty-five grams of IB-PMS (an isobutylene-para-methylstyrene copolymer having a number average molecular weight of approximately 60,000, and a molecular weight distribution of approximately 2.05) and 3 grams of maleic anhydride are loaded into a Brabender™ mixer at 180° C. and 60 rpm and are mixed for 1 minute. In a separate beaker, LUPEROX™ P (tert butyl peroxybenzoate; 1.4 mL) is dissolved in acetone (3 mL) and the solution is slowly added to the Brabender™ mixer. After all the LUPEROX™ solution is added, the mixture is mixed for an additional 8 minutes. The Brabender™ mixer is then heated to 210° C. and the mixture is mixed for 2 minutes, causing the LUPEROX® to initiate a reaction; the maleic anhydride, peroxybenzoate, and polymer react to form a maleic anhydride modified IB-PMS polymer (IB-PMS-MA). This procedure is repeated to generate sufficient volumes of IB-PMS-MA, with the resulting product combined and dried under vacuum at 100° C. for 10 hours. The reactions will result in an IB-PMS-MA having approximately 0.5 weight percent anhydride functionality.

In a 2-liter jacketed reactor, IB-PMS-MA (9.6 grams) and BIMSM A (50.4 grams) are dissolved in cyclohexane (700 mL). 175 grams of water is added to the mixture for example 16, and the solution is stirred for 5 minutes. ZrP-APM-50-400, (4.8 grams), is then added, and the mixture is stirred for an additional 20 minutes. The resulting solution is collected in a container and the solvent is evaporated. The product is dried under vacuum at 100° C. overnight to form a dried Zr—P-rubber mixture.

Forty (40) grams of the dried Zr—P-rubber mixture is loaded into a Brabender™ mixer with carbon black (N330, 22.2 grams) and mixed for 8 minutes at 140° C. and 60 rpm. Curatives are then added to the mixture (stearic acid, KADOX® 911, and MBTS, 0.33 grams each) and stirred at 40° C. and 40 rpm for 3 minutes. The material is then collected and formed into pads for permeation measurement as described above. The formulations are detailed in Table 5 below.

TABLE 5

Formulations for Examples 15 and 16.

| Example # | BIMSM (grams) | Nanofiller Type | IB-PMS-MA (grams) | Water (mL) |
|---|---|---|---|---|
| 15 | 50.4 | ZrP-APM-50-400 | 9.6 | 0 |
| 16 | 50.4 | ZrP-APM-50-400 | 9.6 | 175 |

Prophetic Examples 17-24

Fifty-five grams of IB-PMS and maleic anhydride as indicated in Table 6 (3 or 4.5 g) are loaded into a Brabender™ mixer at 180° C. and 60 rpm and mixed for 1 minute. In a separate beaker, LUPEROX™ P (tert butyl peroxybenzoate; 1.4 or 2.1 mL) is dissolved in acetone (3 or 4.5 mL), and the solution is slowly added to the Brabender™ mixer. After all the LUPEROX™ solution is added, the mixture is mixed for an additional 8 minutes. The Brabender™ is then heated to 210° C. and the mixture mixed for 2 minutes, causing the Luperox® to initiate a reaction. The maleic anhydride, peroxybenzoate, and IB-PMS will react to form a maleic anhydride modified IB-PMS (IB-PMS-a). This procedure is repeated to generate sufficient volume of IB-PMS-a at each anhydride level, with the resulting product combined and dried under vacuum at 100° C. for 10 hours.

In a 2-liter jacketed reactor, IB-PMS-a (9.6 grams) and BIMSM A (50.4 grams) are dissolved in cyclohexane (700 mL). 175 ml of Water is added to the mixture, except examples 17 and 21, and the solution is stirred for 5 minutes. ZrP-APM-50-400, 4.8 grams, is then added, and the mixture stirred for an additional 20 minutes. The resulting solution is collected in a container and the solvent evaporated. The product is dried under vacuum at 100° C. overnight to form a dried ZrP-rubber mixture.

Forty (40) grams of the dried ZrP-rubber mixture are loaded into a Brabender™ mixer and mixed with carbon black (N330, 20.0 grams) for 8 minutes at 140° C. and 60 rpm. Curatives are then added to the mixture (stearic acid, KADOX® 911, and MBTS, 0.33 grams each) with stirring at 50° C. and 40 rpm for 3 minutes. The material is then collected and formed into pads for permeation measurement as described above. The formulations are detailed in Table 6 below.

TABLE 6

Formulations for Examples 17-24.

| Example # | LUPEROX ® P (for MAXP 50) (mL) | Maleic Anhydride (for MAXP 50) (grams) | Water (for ZrP-rubber prep.) (mL) | Water pH (for ZrP-rubber prep.) |
|---|---|---|---|---|
| 17 | 1.4 | 3.0 | 0 | N/A |
| 18 | 1.4 | 3.0 | 175 | 5 |
| 19 | 1.4 | 3.0 | 175 | 7 |
| 20 | 1.4 | 3.0 | 175 | 9 |
| 21 | 2.1 | 4.5 | 0 | N/A |
| 22 | 2.1 | 4.5 | 175 | 5 |
| 23 | 2.1 | 4.5 | 175 | 7 |
| 24 | 2.1 | 4.5 | 175 | 9 |

Prophetic Examples 25-27

Fifty-five grams of IB-PMS and the amount of maleic anhydride indicated in Table 7 are loaded into a Brabender™ mixer at 180° C. and 60 rpm and are mixed for 1 minute. In a separate beaker, LUPEROX™ P (tert butyl peroxybenzoate; 1.4 mL) is dissolved in acetone (5 mL), and the solution is slowly added to the Brabender™. After all LUPEROX™ solution is added, the mixture is mixed for an additional 8 minutes. The Brabender™ is then heated to 210° C. and the mixture mixed for 2 minutes, causing the LUPEROX™ to initiate a reaction and the maleic anhydride, peroxybenzoate, and IB-PMS to react to form a maleic anhydride modified IB-PMS (IB-PMS-MA-b). This procedure is repeated to generate sufficient volume of IB-PMS-MA-b at each anhydride level, with the resulting product combined and dried under vacuum at 100° C. for 10 hours.

A glass bottle is filled with cyclohexane (750 mL). IB-PMS-MA-b and ZrP-APM-50-400 (6.4 g each) are added to the cyclohexane and mixed on a shaker for 6 hours. BIMSM A (73.6 g) is then added and the solution mixed on a shaker for 3 hours to dissolve the polymer. The resulting solution is collected and the solvent evaporated. The product is dried under vacuum at 70° C. for 10 hours and further dried on a mill for 10 to 15 minutes at 130° C. to form a dried ZrP-rubber mixture.

Thirty-six (36) grams of the dried ZrP-rubber mixture are then loaded into a Brabender™ mixer and mixed with carbon black (N330, 20.0 grams) for 8 minutes at 140° C. and 60 rpm. Curatives are then added to the mixture (stearic acid, KADOX® 911, and MBTS, 0.33 grams each) and stirred at 50° C. and 40 rpm for 3 minutes. The material is then collected and formed into pads for permeation measurement as described above. The formulations are detailed in Table 7 below.

TABLE 7

Formulations for Examples 25-27.

| Example | LUPEROX ® P (for IB-PMS-MA-b) (mL) | Maleic Anhydride (for IB-PMS-MA-b) (grams) | ZrP Type |
|---|---|---|---|
| 25 | 1.99 | 3.0 | ZrP-APM-50-400 |
| 26 | 3.98 | 6.0 | ZrP-APM-50-400 |
| 27 | 5.96 | 9.0 | ZrP-APM-50-400 |

Prophetic Examples 28-32

BIMSM A (80 g) and PIBSA (amount indicated in table below) are dissolved in 700 mL cyclohexane in a glass container. The solution is transferred into a mantled reactor. The container is washed with 100 mL of cyclohexane and the washing solution is also added to the reactor. Then, 200 mL of water, a HCl solution, or a NaOH solution are added (for pH=5, HCl solution is used; for pH=9, NaOH solution is used). After stirring the mixture at 70° C., 3.4 g of ZrP-APM-50-400 are added, and the mixture stirred for 30 minutes. The mixture is poured out and the solvent evaporated. The sample is dried under vacuum for 24 hours at 100° C., collected and formed into pads. The permeability of the resulting nanocomposite is tested as described above. The formulations are presented in Table 8.

TABLE 8

Nanocomposites formed with PIBSA.

| Example | ZrP-APM-50-400, g | PIBSA (MW = 950) (mg) | Water (mL) | Water pH |
|---|---|---|---|---|
| 28 | 3.4 | 1.0 | 200 | Neutral |
| 29 | 3.4 | 1.5 | 200 | Neutral |
| 30 | 3.4 | 2.2 | 200 | Neutral |
| 31 | 3.4 | 1.5 | 200 | 5 |
| 32 | 3.4 | 1.5 | 200 | 9 |

Prophetic Examples 33-38

BIMSM A (80 g) and PIBSA are dissolved in 700 mL cyclohexane in a glass container. The solution is transferred into a glass reactor at 50° C. The container is washed with 100 mL cyclohexane and the washing solution is added to the reactor. Then, 200 mL of water, a HCl solution, or a NaOH solution are added (for pH=5, HCl solution is used; for pH=9, NaOH solution is used). After the solution is mixed with 3.4 grams of ZrP-APM-50-400 for 30 minutes, the solution is precipitated with isopropanol. The product is dried under vacuum for 24 hours at 100° C., collected and formed into pads. The permeability of the resulting nanocomposite is tested as described above. The formulations are presented in Table 9.

TABLE 9

Nanocomposites formed with PIBSA.

| Example | ZrP-APM-50-400 (g) | PIBSA (g) | Water (mL) | Water pH |
|---|---|---|---|---|
| 33 | 3.4 | 2 | 200 | Neutral |
| 34 | 3.4 | 4 | 200 | Neutral |
| 35 | 3.4 | 6 | 200 | Neutral |
| 36 | 3.4 | 4 | 200 | 5 |
| 37 | 3.4 | 4 | 200 | 9 |

Embodiments of the final nanocomposite of the present invention are useful as air barriers, such as used in producing innerliners for tires for motor vehicles. In particular, the nanocomposites are useful in innerliners and innertubes for articles such as truck tires, bus tires, passenger automobile tires, motorcycle tires, and the like.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted, to the extent not inconsistent with this disclosure.

We claim:

1. A nanocomposite comprising:
   a nanofiller of a metal phosphate having a phosphate acid group blended in an isobutylene based elastomer, wherein the phosphate acid group is reacted with an organic compound capable of hydrogen bonding with the phosphate acid group.

2. The nanocomposite of claim 1 wherein the nanofiller comprises platelets having an aspect ratio of 200 or more.

3. The nanocomposite of claim 1 wherein the nanofiller comprises platelets having an aspect ratio of 375 or more.

4. The nanocomposite of claim 1 wherein the nanofiller comprises platelets having an aspect ratio of 500 or more.

5. The nanocomposite of claim 1 wherein the metal phosphate comprises titanium phosphate.

6. The nanocomposite of claim 1 wherein the metal phosphate comprises alpha-zirconium phosphate.

7. The nanocomposite of claim 1 comprising from 0.1 to 30 phr of the nanofiller.

8. The nanocomposite of claim 1 wherein the nanofiller is intercalated.

9. The nanocomposite of claim 1 wherein the nanofiller is exfoliated in the elastomer.

10. The nanocomposite of claim 1 wherein the nanofiller is a mixture of intercalated nanofiller and partially exfoliated nanofiller in the elastomer.

11. The nanocomposite of claim 10 wherein from 0.0001 to 10 volume percent of the nanofiller is exfoliated.

12. The nanocomposite of claim 10 wherein from 0.005 to 5 volume percent of the nanofiller is exfoliated.

13. The nanocomposite of claim 1 wherein the phosphate-hydrogen-bonding organic compound comprises an amine.

14. The nanocomposite of claim 13 wherein the nanofiller is amine-exchanged in an amount effective to intercalate the nanofiller.

15. The nanocomposite of claim 13 wherein the nanofiller is amine-exchanged in an amount of at least 25 but less than 100 percent of exchange capacity of the nanofiller.

16. The nanocomposite of claim 13 wherein the nanofiller is amine-exchanged at from 25 to 50 percent of exchange capacity of the nanofiller.

17. The nanocomposite of claim 13 wherein the amine comprises a monoamine.

18. The nanocomposite of claim 13 wherein the amine comprises a primary amine.

19. The nanocomposite of claim 13 wherein the amine comprises a secondary amine.

20. The nanocomposite of claim 13 wherein the amine comprises a tertiary amine.

21. The nanocomposite of claim 13 wherein the amine comprises a quaternary amine.

22. The nanocomposite of claim 13 wherein the amine comprises a short chain alkylamine.

23. The nanocomposite of claim 13 wherein the amine comprises a long chain alkylamine.

24. The nanocomposite of claim 13 wherein the amine is exchanged in an overlapping configuration between opposing phosphate surfaces.

25. The nanocomposite of claim 13 wherein the amine is exchanged in a double layer configuration between opposing phosphate surfaces.

26. The nanocomposite of claim 13 wherein the amine comprises a diamine.

27. The nanocomposite of claim 26 wherein the diamine comprises two primary amine groups.

28. The nanocomposite of claim 26 wherein the diamine comprises a primary amine group and a tertiary amine.

29. The nanocomposite of claim 28 wherein a ratio of amine to reacted phosphate groups is less than 1 and the primary amine is predominantly attached to the phosphate.

30. The nanocomposite of claim 28 wherein a ratio of amine to reacted phosphate groups is greater than 1 and the tertiary amine is predominantly attached to the phosphate.

31. The nanocomposite of claim 28 wherein a ratio of amine to reacted phosphate groups is between 0.5 and 2 and the amine attachment to the phosphate is heterogeneous.

32. The nanocomposite of claim 13 wherein the amine comprises an amine-terminated oligoamide.

33. The nanocomposite of claim 32 wherein the oligoamide comprises from 2 to 4 monomer units.

34. The nanocomposite of claim 33 wherein the oligoamide monomer units comprise from 2 to 12 carbons per unit.

35. The nanocomposite of claim 32 wherein the oligoamide comprises a molecular weight from 150 to 2000 Daltons.

36. The nanocomposite of claim 13 wherein the amine comprises a mixture of monoamine and diamine in a molar ratio of monoamine:diamine from 1:20 to 20:1.

37. The nanocomposite of claim 36 wherein the monoamine comprises a primary amine and the diamine comprises a primary amine group and a tertiary amine group.

38. The nanocomposite of claim 36 wherein the diamine comprises a mixture of primary-tertiary diamine and primary-secondary diamine.

39. The nanocomposite of claim 36 wherein the nanofiller is amine-exchanged at from 25 to 50 percent of exchange capacity and a molar ratio of monoamine to diamine is from 1:1 to 20:1.

40. The nanocomposite of claim 39 wherein the molar ratio of monoamine to diamine is from 3:1 to 10:1.

41. The nanocomposite of claim 13 further comprising a dispersant aid comprising a low molecular weight polymer or oligomer functionalized with a polar group and blended in a matrix of the elastomer.

42. The nanocomposite of claim 41 wherein the dispersant aid comprises a polymer or oligomer of a $C_4$-$C_8$ isoolefin.

43. The nanocomposite of claim 42 wherein the isoolefin in the low molecular weight polymer or oligomer comprises isobutylene.

44. The nanocomposite of claim 41 wherein the dispersant aid comprises an interpolymer of a $C_4$-$C_7$ isoolefin and an alkylstyrene.

45. The nanocomposite of claim 41 wherein the dispersant aid comprises a polyamide with terminal amine groups.

46. The nanocomposite of claim 45 wherein the polyamide comprises polyoxyalkylenediamine polyamide obtained as the reaction product of a polyoxyalkylenediamine and a dicarboxylic acid.

47. The nanocomposite of claim 41 wherein the low molecular weight polymer or oligomer has a number average molecular between 500 and 50000.

48. The nanocomposite of claim 41 wherein the low molecular weight polymer or oligomer has a number average molecular between 2000 and 25000.

49. The nanocomposite of claim 41 wherein the polar group comprises from 0.1 to 10 weight percent of the polymer or oligomer.

50. The nanocomposite of claim 41 wherein the polar group comprises from 0.5 to 7.0 weight percent of the low molecular weight polymer or oligomer.

51. The nanocomposite of claim 41 wherein a weight ratio of the functionalized low molecular weight polymer or oligomer to the elastomer is between 0.01:1 and 1:1.

52. The nanocomposite of claim 41 wherein a weight ratio of the functionalized low molecular weight polymer or oligomer to the elastomer is between 0.05:1 and 0.5:1.

53. The nanocomposite of claim 41 wherein the low molecular weight polymer or oligomer is functionalized with the polar group selected from the group consisting of alcohols, ethers, acids, anhydrides, nitriles, amines, acrylates, esters, ammonium ions, and combinations thereof.

54. The nanocomposite of claim 53 wherein the low molecular weight polymer or oligomer is functionalized with a primary amine.

55. The nanocomposite of claim 53 wherein the low molecular weight polymer or oligomer is functionalized with a secondary amine.

56. The nanocomposite of claim 53 wherein the low molecular weight polymer or oligomer is functionalized with a tertiary amine.

57. The nanocomposite of claim 53 wherein the low molecular weight polymer or oligomer is functionalized with a quaternary amine.

58. The nanocomposite of claim 53 wherein the low molecular weight polymer or oligomer is functionalized with the polar group derived from an acid anhydride selected from the group consisting of cyclic anhydride, symmetric anhydride, mixed anhydride, and combinations thereof.

59. The nanocomposite of claim 58 wherein the acid anhydride is selected from the group consisting of carboxylic anhydride, thioanhydride, phosphoric anhydride, and combinations thereof.

60. The nanocomposite of claim 58 wherein the acid anhydride is a carboxylic acid anhydride.

61. The nanocomposite of claim 60 wherein the carboxylic acid anhydride is maleic anhydride, succinic anhydride, or a combination thereof.

62. The nanocomposite of claim 53 wherein the low molecular weight polymer or oligomer is functionalized with the polar group derived from an acid selected from the group consisting of carboxylic acid, dicarboxylic acid, tricarboxylic acid, oxo carboxylic acid, peroxy acid, thiocarboxylic acid, sulfonic acid, sulfinic acid, xanthic acid, sulfenic acid, sulfamic acid, phosphonic acid, amic acid, azinic acid, azonic acid, hydroxamic acid, imidic acid, imino acid, nitrosolic acid, nitrolic acid, hydrazonic acid, and combinations thereof.

63. The nanocomposite of claim 41 wherein the low molecular weight polymer or oligomer is grafted to an exchanged-amine on the phosphate.

64. The nanocomposite of claim 63 wherein the grafting is obtained by reaction between the exchanged amine and the polar group on the low molecular weight polymer or oligomer.

65. The nanocomposite of claim 64 wherein the grafting reaction forms an amide linkage between a free amine group in the exchanged amine and an acid functional group on the low molecular weight polymer or oligomer.

66. The nanocomposite of claim 1 wherein the elastomer comprises an interpolymer of isobutylene and an alkylstyrene.

67. The nanocomposite of claim 66 wherein the elastomer has a number average molecular weight between 25000 and 500000.

68. The nanocomposite of claim 66 wherein the elastomer has a number average molecular weight of at least 100000.

69. The nanocomposite of claim 66 wherein the elastomer comprises functional groups selected from the group consisting of halides, ethers, amines, amides, esters, acids, and hydroxyls.

70. The nanocomposite of claim 13 wherein the elastomer is functionalized with an amine.

71. The nanocomposite of claim 1 wherein the elastomer is halogenated with bromine or chlorine.

72. The nanocomposite of claim 71 wherein the elastomer comprises halogenated polyisobutylene.

73. The nanocomposite of claim 71 wherein the elastomer comprises a halogenated copolymer of isobutylene and para-methylstyrene.

74. The nanocomposite of claim 1 wherein the elastomer is halogenated and functionalized with an amine.

75. The nanocomposite of claim 1 wherein the elastomer comprises a polymer chain E comprising an ammonium-functionalized group wherein the ammonium functionalized group is described by the following group pendant to the polymer chain E:

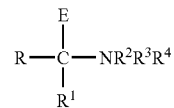

wherein R and $R^1$ are the same or different and are one of a hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions.

76. The nanocomposite of claim 1 further comprising a filler selected from calcium carbonate, mica, silica, silicates, talc, titanium dioxide, carbon black, and mixtures thereof.

77. The nanocomposite of claim 1 further comprising dye, pigment, antioxidant, heat and light stabilizer, plasticizer, oil, or mixture thereof.

78. The nanocomposite of claim 1 further comprising organic peroxide, zinc oxide, zinc stearate, stearic acid, an accelerator, a vulcanizing agent, or mixture thereof.

* * * * *